United States Patent
Ohira et al.

(10) Patent No.: US 11,620,728 B2
(45) Date of Patent: Apr. 4, 2023

(54) INFORMATION PROCESSING DEVICE, INFORMATION PROCESSING SYSTEM, INFORMATION PROCESSING METHOD, AND PROGRAM

(71) Applicants: Kabushiki Kaisha Toshiba, Minato-ku (JP); Toshiba Digital Solutions Corporation, Kawasaki (JP)

(72) Inventors: Hidetaka Ohira, Fuchu (JP); Shuta Yanaga, Kawasaki (JP); Ryohei Tanaka, Kawasaki (JP); Kenji Furukawa, Machida (JP); Mayumi Ikeda, Ota (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 392 days.

(21) Appl. No.: 16/812,443

(22) Filed: Mar. 9, 2020

(65) Prior Publication Data
US 2020/0302572 A1    Sep. 24, 2020

(30) Foreign Application Priority Data
Mar. 20, 2019   (JP) .............................. JP2019-053363

(51) Int. Cl.
*G06K 9/00*    (2022.01)
*G06T 3/00*    (2006.01)
*G06F 21/62*   (2013.01)

(52) U.S. Cl.
CPC ........ *G06T 3/0093* (2013.01); *G06F 21/6254* (2013.01)

(58) Field of Classification Search
CPC .................................................. G06T 3/0093
See application file for complete search history.

(56) References Cited

U.S. PATENT DOCUMENTS

2009/0087036 A1    4/2009 Imaoka
2015/0279021 A1*  10/2015 Wu ........................ G06T 7/277
                                                          382/103
(Continued)

FOREIGN PATENT DOCUMENTS

JP    2006-338092 A    12/2006
JP    2016-71639 A      5/2016

OTHER PUBLICATIONS

Noboru Babaguchi, et al., "Privacy Protected Visual Processing for Secure Video Surveillance," IPSJ SIG Technical Report, Information Processing Society of Japan, vol. 2007, No. 1, Jan. 2007, 18 pages (with English Abstract and English machine translation).

(Continued)

*Primary Examiner* — Oneal R Mistry
(74) *Attorney, Agent, or Firm* — Maier & Maier, PLLC

(57) ABSTRACT

An information processing device, an information processing system, an information processing method, and a program capable of appropriately reducing the amount of information of an image are provided. An information processing device includes an image acquisitor, an information amount reduction degree determiner, and an information amount reducer. The image acquisitor acquires an image acquired by imaging an actual space. The information amount reduction degree determiner determines a degree of reduction of an amount of information on the basis of an attribute of a subject shown in the image. The information amount reducer generates information reduced data acquired by reducing at least a part of the amount of information of the image in accordance with the degree of reduction of the amount of information.

13 Claims, 21 Drawing Sheets

(56) References Cited

U.S. PATENT DOCUMENTS

2018/0012078 A1* 1/2018 Pournaghi ............... G06T 7/246
2019/0130165 A1* 5/2019 Seshadri .............. G06V 40/161
2019/0130191 A1* 5/2019 Zhou .................... G06K 9/6274
2019/0213420 A1* 7/2019 Karyodisa .......... G06V 10/7788
2019/0258878 A1* 8/2019 Koivisto ............. G06V 10/762
2020/0151441 A1* 5/2020 Doumbouya .......... G06V 10/75

OTHER PUBLICATIONS

Tansuriyavong Suriyon., et al., "Concealment of Persons Using Face Recognition in Circumstantial Video Image," The Journal of The Institute of Image Information and Television Engineers, Japan, The Institute of Image Information and Television Engineers, vol. 56, No. 12, Dec. 2002, 24 pages (with English Abstract and English machine translation).

* cited by examiner

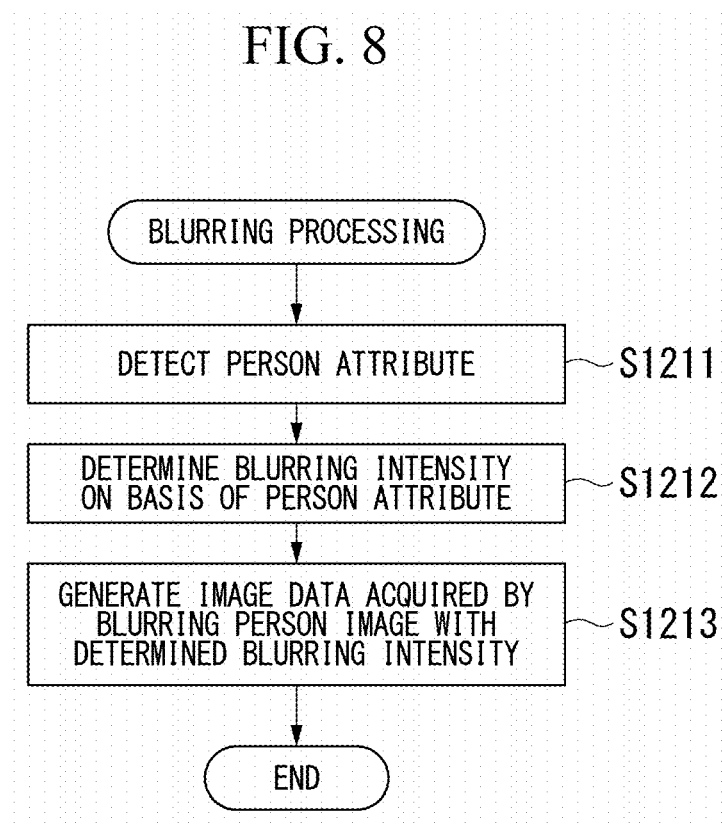

FIG. 9

| | U11 | U12 | U13 | U14 | U15 |
|---|---|---|---|---|---|
| ATTRIBUTE (HAIR) | LONG HAIR | SHORT HAIR | SHORT HAIR | SHORT HAIR | HAT |
| APPEARANCE FREQUENCY (NUMBER OF TIMES) | LOW (1) | HIGH (3) | HIGH (3) | HIGH (3) | LOW (1) |
| BLURRING INTENSITY (HAIR) | STRONG | WEAK | WEAK | WEAK | STRONG |
| ATTRIBUTE (COLOR OF CLOTHING) | RED | GREEN | BLUE | BLUE | BLUE |
| APPEARANCE FREQUENCY (NUMBER OF TIMES) | LOW (1) | LOW (1) | HIGH (3) | HIGH (3) | HIGH (3) |
| BLURRING INTENSITY (CLOTHING) | STRONG | STRONG | WEAK | WEAK | WEAK |
| ATTRIBUTE (COLOR OF TROUSERS) | BLUE | BLUE | GREEN | BLUE | BLUE |
| APPEARANCE FREQUENCY (NUMBER OF TIMES) | HIGH (4) | HIGH (4) | LOW (1) | HIGH (4) | HIGH (4) |
| BLURRING INTENSITY (TROUSERS) | WEAK | WEAK | STRONG | WEAK | WEAK |

FIG. 13

| ATTRIBUTE (COLOR OF CLOTHING) | GREEN | RED | BLUE | BLUE | BLUE |
|---|---|---|---|---|---|
| APPEARANCE FREQUENCY (NUMBER OF TIMES) | LOW (1) | LOW (1) | HIGH (3) | HIGH (3) | HIGH (3) |
| BLURRING INTENSITY | STRONG | STRONG | WEAK + STRONG | WEAK + STRONG | WEAK + STRONG |

INFORMATION PROCESSING DEVICE, INFORMATION PROCESSING SYSTEM, INFORMATION PROCESSING METHOD, AND PROGRAM

BACKGROUND OF THE INVENTION

Technical Field

Embodiments of the present invention relate to an information processing device, an information processing system, an information processing method, and a program.

Related Art

Japanese Unexamined Patent Application, First Publication No. 2016-71639 disclose a technology for collating individual faces while reducing the information used for identifying individuals by calculating and collating feature quantities of subjects (faces and the like) after performing blurring processing for subjects (faces and the like) shown in an image acquired by a monitoring camera.

However, in the technology described above, although privacy is protected by performing blurring processing for an image, feature quantities are calculated and collated from images of which information is reduced, and accordingly, there are cases in which collation accuracy of images becomes low.

SUMMARY

An information processing device according to an embodiment includes an image acquisitor, an information amount reduction degree determiner, and an information amount reducer. The image acquisitor acquires an image acquired by imaging an actual space. The information amount reduction degree determiner determines a degree of reduction of an amount of information on the basis of an attribute of a subject shown in the image. The information amount reducer generates information reduced data acquired by reducing at least a part of the amount of information of the image in accordance with the degree of reduction of the amount of information.

BRIEF DESCRIPTION OF THE DRAWINGS

FIG. 8 is a flowchart illustrating details of blurring processing according to the first embodiment;

FIG. 9 is a diagram illustrating an example of a setting of a blurring intensity for each part of a person according to a second embodiment;

FIG. 13 is a diagram illustrating a blurring intensity according to a fourth embodiment;

DETAILED DESCRIPTION OF THE INVENTION

Hereinafter, an information processing device, an information processing system, an information processing method, and a program according to embodiments will be described with reference to the drawings.

First Embodiment

First, an overview of an information processing system according to this embodiment will be described.

Figure 1:
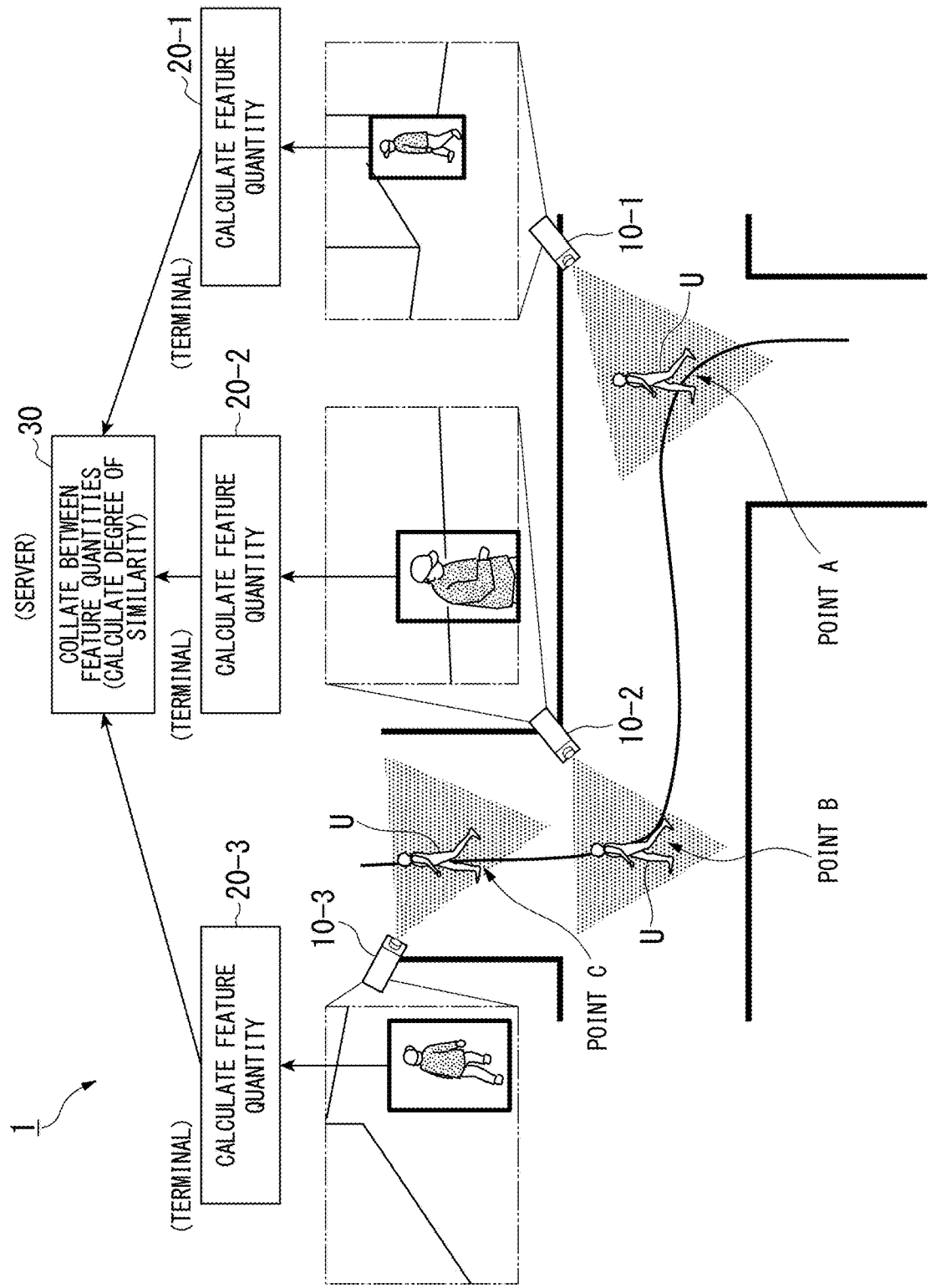
FIG. 1 is a system diagram illustrating an overview of an information processing system according to a first embodiment.

FIG. 1 is a system diagram illustrating an overview of the information processing system 1 according to this embodiment. The information processing system 1 is a system that associates the same persons captured by cameras (Person Re-identification (Re-id)) by calculating and collating feature quantities of persons from images captured by a plurality of the cameras 10 (10-1, 10-2, 10-3, . . . ) installed at a station yard, the inside of a commercial facility, a shopping district, or the like. Each of terminals 20 (20-1, 20-2, 20-3, . . . ) connected to the cameras 10 calculates feature quantities of subjects (persons and the like) shown in an image captured by the camera 10 and transmits the calculated feature quantities to a server 30. The server 30 receives feature quantities transmitted from each terminal 20. The server 30 collates feature quantities received from the terminals 20 and associates feature quantities determined as in the same person with each other on the basis of collation results (a degree of similarity). In this way, the information processing system 1 can detect behaviors of the same person and can collect statistical information such as features and a behavior pattern of each person in a yard, inside a commercial facility, on a shopping street, and the like.

For example, as illustrated in the drawing, it is assumed that a person U moves in an order of points A, B, and C. The person U at the time of being present at the spot A is shown in an image captured by the camera 10-1. The person U at the time of being present at the spot B is shown in an image captured by the camera 10-2. The person U at the time of being present at the spot C is shown in an image captured by the camera 10-3. The terminal 20-1 calculates a feature quantity of the person U from the image in which the person U at the time of being present at the spot A is shown captured by the camera 10-1 and transmits the calculated feature quantity to the server 30 in association with capture time information. The terminal 20-2 calculates a feature quantity of the person U from the image in which the person U at the time of being present at the spot B is shown captured by the camera 10-2 and transmits the calculated feature quantity to the server 30 in association with capture time information. The terminal 20-3 calculates a feature quantity of the person U from the image in which the person U at the time of being present at the spot C is shown captured by the camera 10-3 and transmits the calculated feature quantity to the server 30 in association with capture time information. The server 30 collates the feature quantities transmitted from the terminals 20 and associates feature quantities determined to be the same person with each other. In this way, the information processing system 1 can detect a behavior of a certain same person (here, the person U). In addition, the information processing system 1 does not perform identification of individuals for identifying a person who is represented by the feature quantities associated as the same person.

Meanwhile, as described above, in the technology of determining whether persons are the same or not by collating feature quantities of subjects (persons and the like) captured by the cameras 10, it is necessary to collect feature quantities of subjects (persons and the like) and at least temporarily store the collected feature quantities in a storage medium such as a hard disk or a memory, and a high security level needs to be set therefor from the point of view of privacy protection. However, a high cost is incurred for building a high-security environment. While a high-security environment needs to be built in, in the case of opening/closing an airport gate using face authentication, account management using fingerprint authentication, and the like, in a case in which an individual does not need to be identified, and, for example, collection of statistical information of features, behavior patterns, and the like of visitors for a facility is a target, there is a problem that the cost of building a high-security environment therefor is high.

Thus, the terminal 20 calculates a feature quantity from information reduced data that is acquired by reducing the amount of information such that an individual cannot be identified. For example, the terminal 20 performs an information amount reducing process with a predetermined degree of reduction of the amount of information for images of subjects (persons and the like) captured by the cameras 10, calculates feature quantities of the subjects (persons and the like) from the information reduced data after reduction of the amount of information, and transmits the calculated feature quantities to the server 30. In this way, an individual cannot be identified using information (feature quantities) that is transmitted from the terminals 20 to the server 30 and is stored in the server 30, and accordingly, a system that takes privacy into consideration even when a security level of a storage medium storing feature quantities is low can be configured.

For example, the degree of reduction of the amount of information may be defined according to a value of a sharpness of an image, a resolution of an image, a bit depth of an image, a JPEG compression rate of an image, an intensity of a mosaic, image filling, a contrast of an image, a brightness of an image, an aspect ratio of an image, or the like. The information reduced data is acquired by performing an information amount reducing process on an original image by applying a value of the degree of reduction of the amount of information. Regarding this amount of information of an image, for example, for the sharpness of an image, the resolution of an image, and the bit depth of an image, the amount of information is larger when the value thereof is higher, and the amount of information is smaller when the value thereof is lower. For a JPEG compression image of an image and the intensity of the mosaic, the amount of information is larger when the value thereof is lower, and the amount of information is smaller when the value thereof is higher. For the filling of an image, the amount of information is larger when a filled area is smaller, and the information is smaller when the filled area is larger. For the contrast of an image and the brightness of an image, the amount of information is larger with appropriate values thereof, and the amount of information is smaller with inappropriate values thereof. Setting values for which an image has little overexposure, is not too dark, and in which objects have a clear outline is appropriate.

Here, an example in which the resolution of an image is reduced by applying blurring processing using a moving average filter, a Gaussian filter, or the like as an information amount reducing process will be described. When a degree of reduction of the amount of information in the blurring processing is a blurring intensity, it is assumed that the degree of reduction of the amount of information is higher in a case in which the blurring intensity is "strong" than in a case in which the blurring intensity is "weak."

Figure 2:
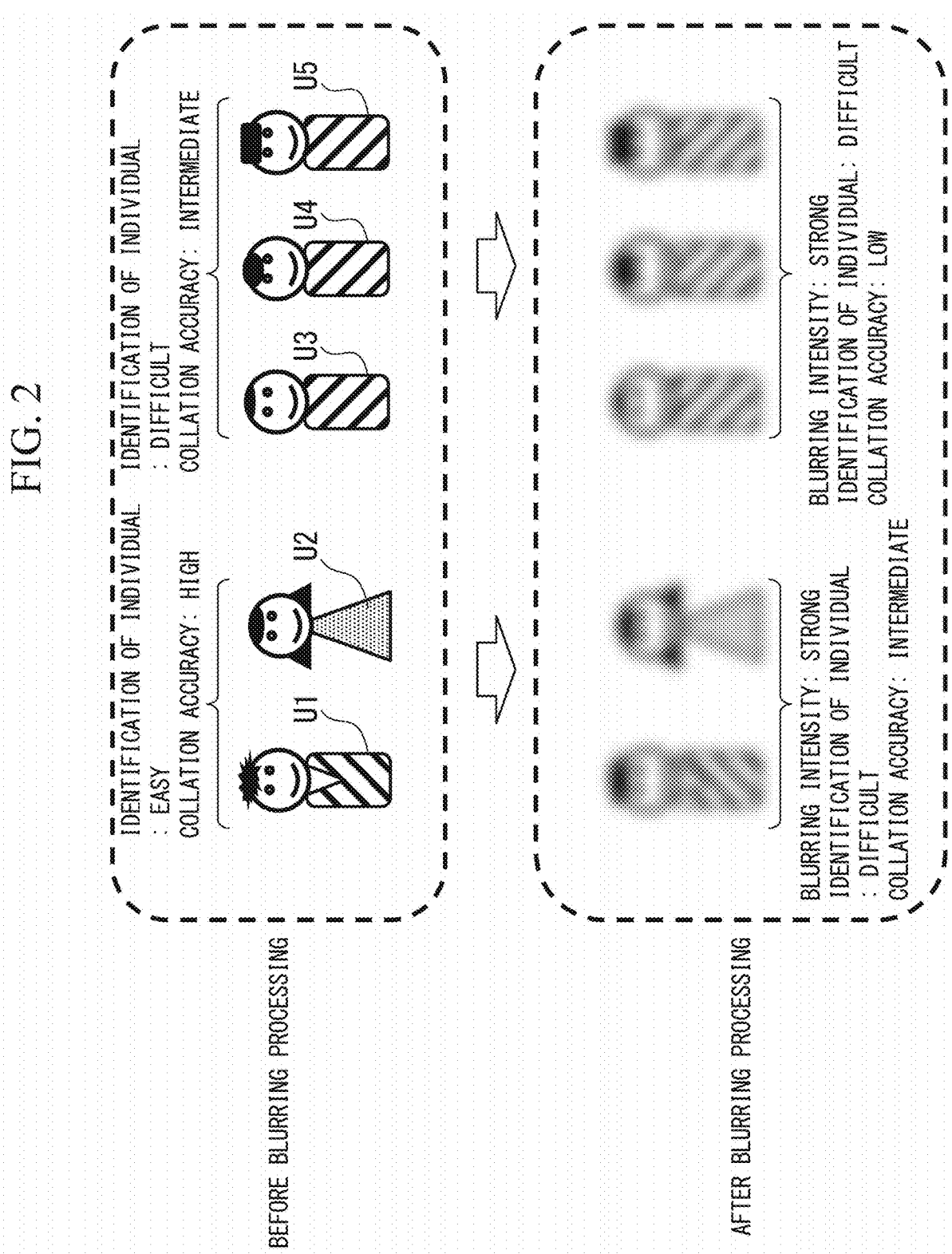
FIG. 2 is a diagram illustrating an example in which the amounts of information are uniformly reduced in person images.

FIG. 2 is a diagram illustrating an example in which the amounts of information are uniformly reduced in person images. This drawing illustrates an example of a case in which the amount of information is reduced by performing blurring processing uniformly with the same intensity "strong" for person images of five persons U1, U2, U3, U4, and U5 shown in an image captured by the camera 10. One example of person images before blurring processing is schematically illustrated in an upper part, and one example of person images after blurring processing is schematically illustrated on a lower part. It is assumed that clothing worn by the person U1 is green, clothing worn by the person U2 is red, and clothing worn by the persons U3, U4, and U5 is blue. In the image of the person U1 and the person U2, by performing blurring processing, it can be made difficult to identify individuals, and there is a feature of having different colors of clothing among five persons and the like, and accordingly, even when feature quantities are calculated from an image after the blurring processing, there is no problem in the accuracy of collation. Meanwhile, like the persons U3, U4, and U5, in a case in which the number of persons wearing clothing of the same color increases, the features of these three persons are similar. Thus, in a case in which the blurring intensity is strong, not only it is difficult to identify individuals, but also collation accuracy decreases in an image after blurring processing. In this way, in a case in which the blurring intensity is uniformly strong, although the privacy is taken into account, there is a problem in that the collation accuracy decreases. For this reason, it is necessary to appropriately set the blurring intensity in accordance with a person. An appropriate setting value of the blurring intensity changes in accordance with a hairstyle, a color, clothing, a place, and the like of a target person. For example, in a case in which a person is identified using clothing included in a person image, in a scene such as an office in which many persons are wearing suits, it is difficult to identify a person using clothing. For example, it is necessary to inhibit a decrease in the collation accuracy by setting the blurring intensity to be weak. On the other hand, in a scene in which some persons are wearing conspicuous clothing in a commercial facility or the like, there is a likelihood of being able to easily identify a person from clothing. In such a case, it is necessary to focus on taking privacy into consideration by setting the blurring intensity to be strong.

Thus, in this embodiment, the blurring intensity is changed in accordance with whether it is easy or difficult to identify a person within an image. For a person image of a person who can be easily identified, by setting the blurring intensity to be strong, the privacy is taken into consideration. On the other hand, for a person image of a person who cannot be easily identified, by setting the blurring intensity to be weak, a decrease in the collation accuracy is inhibited. By appropriately setting the blurring intensity for each person image, a decrease in the collation accuracy for persons of which features are similar is inhibited, and decrease in the collation accuracy can be reduced such that it is minimal while the privacy is taken into consideration.

Figure 3:
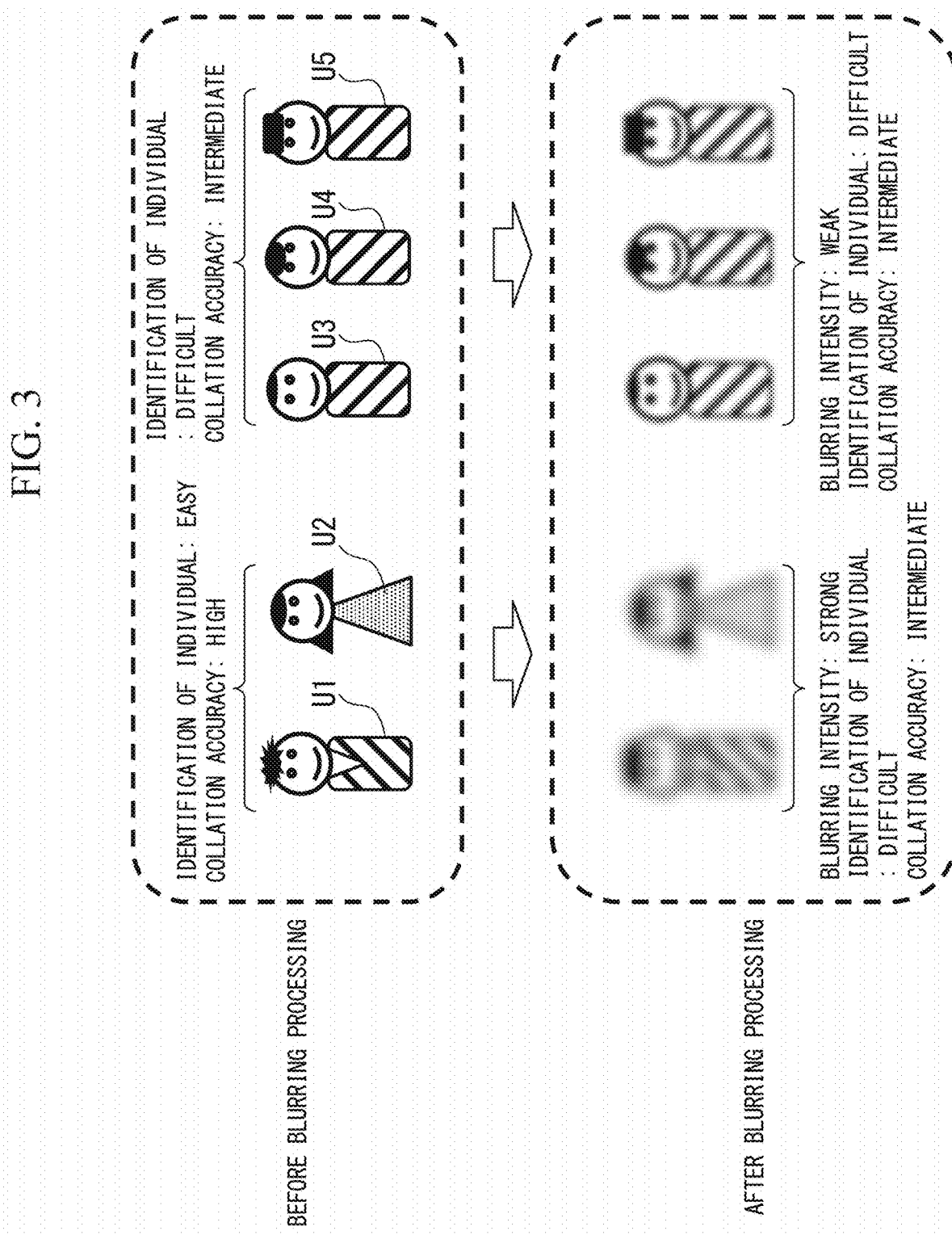
FIG. 3 is a diagram illustrating an example in which the amount of information is reduced in a person image according to the first embodiment.

FIG. 3 is a diagram illustrating an example in which the amount of information is reduced in a person image according to this embodiment. In this diagram, the blurring intensity of blurring processing for an image of persons U3, U4, and U5 whose colors of clothing are the same is set to be weaker than the blurring intensity of blurring processing for an image of persons U1 and U2 whose colors of clothing are different each other, which is different from the example illustrated in FIG. 2. For example, in a case in which there are no persons (or there is a small number of persons) whose colors of clothing are the same, identification of an individual can be easily performed, and accordingly, the information processing system 1 sets the blurring intensity to be strong. On the other hand, in a case in which there are many persons whose colors of clothing are the same, it is difficult to perform identification of an individual, and accordingly, the information processing system 1 sets the blurring intensity to be weak.

In this way, the information processing system 1 sets the degree of reduction of information to be strong for an image of persons (in other words, persons for which individuals can be easily identified) in which an appearance frequency of persons similar to each other is low, and accordingly, it becomes difficult to identify individuals, and high collation accuracy can be secured. On the other hand, the information processing system 1 sets the degree of reduction of information to be weak for an image of persons (in other words, persons for which individuals inherently cannot be easily identified) in which an appearance frequency of persons similar to each other is high, and accordingly, a decrease in the collation accuracy can be inhibited. In other words, the information processing system 1 can appropriately reduce the amount of information of an image, and both protection of privacy and high accuracy of collation of persons can be achieved.

Hereinafter, the configuration of the information processing system 1 will be described in detail.

Figure 4:
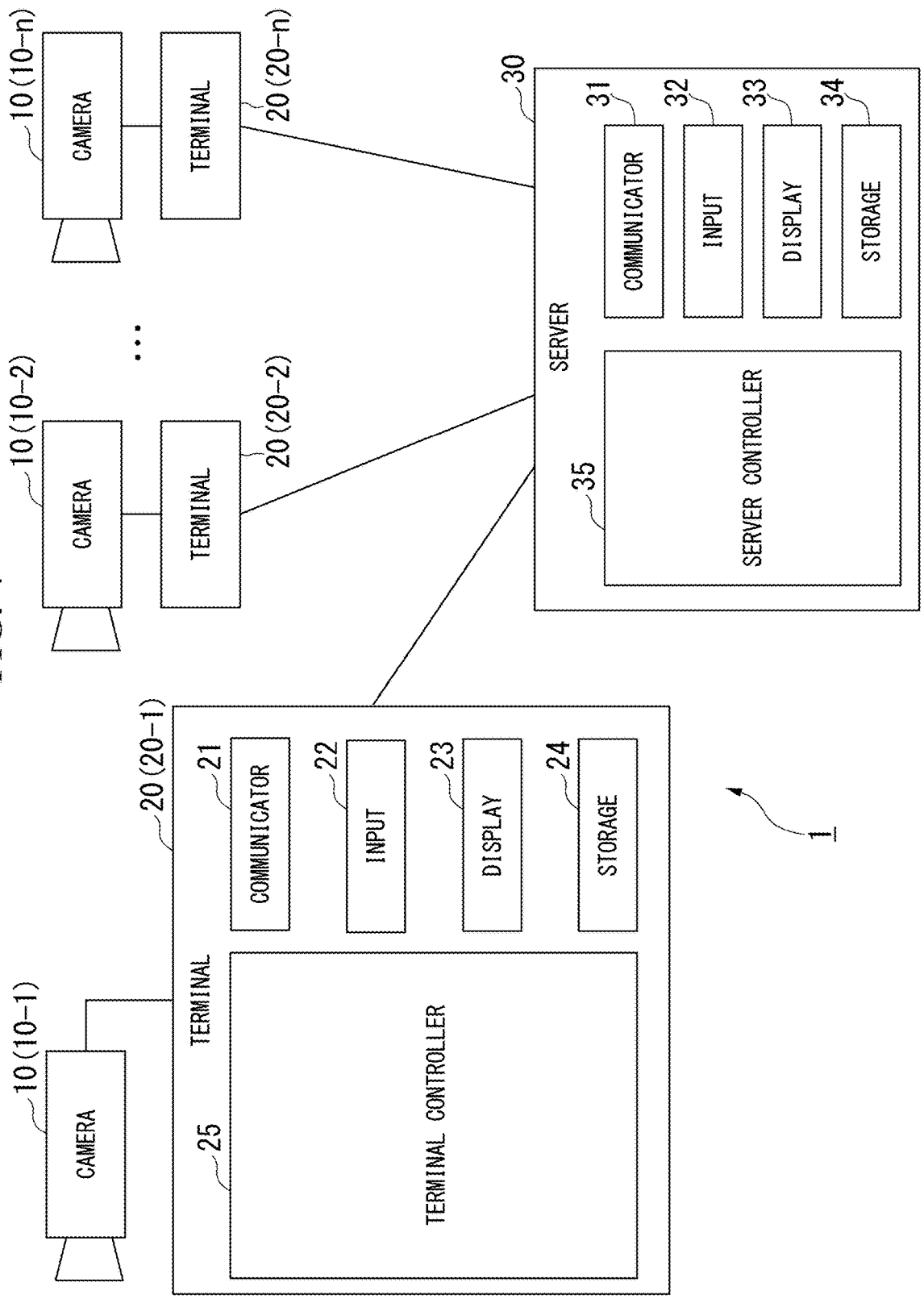
FIG. 4 is a block diagram illustrating one example of the hardware configuration of an information processing system according to the first embodiment.

FIG. 4 is a block diagram illustrating one example of the hardware configuration of an information processing system 1 according to this embodiment. In this drawing, the same reference signs are assigned to components corresponding to FIG. 1. The information processing system 1 includes a plurality of cameras 10 (10-1, 10-2, . . . , 10-n; here n is a natural number), terminals 20 (20-1, 20-2, . . . , 20-n; here, n is a natural number) that are respectively connected to the cameras 10 in a wired or wireless manner, and a server 30. The camera 10, for example, is a video camera, a monitoring camera, a network camera, or the like, captures an image in an actual space at a predetermined field angle, and transmits the captured image to the terminal 20. The image may be either a still image or a moving image. The terminal 20 and the server 30 are information processing devices including computers. The terminal 20 and the server 30 are connected through a communication network. In addition, the camera 10 and the terminal 20 may be integrally configured.

The terminal 20 includes a communicator 21, an input 22, a display 23, a storage 24, and a terminal controller 25. The server 30 includes a communicator 31, an input 32, a display 33, a storage 34, and a server controller 35. Each of the communicator 21 and the communicator 31 is configured to include a digital input/output port such as an Ethernet (registered trademark) port or a universal serial bus (USB) or radio communication such as Wi-Fi (registered trademark), and the like. The communicator 21 and the communicator 31 perform communication through a communication network on the basis of control according to the terminal controller 25 and the server controller 35.

Each of the input 22 and the input 32 is configured to include a keyboard, a mouse, a touch pad, or the like. The input 22 and the input 32 respectively output operation signals representing input operations to the terminal controller 25 and the server controller 35 on the basis of users' operations on a keyboard, a mouse, a touch pad, or the like. In addition, each of the input 22 and the input 32 may be configured integrally with a display as a touch panel.

Each of the display 23 and the display 33 is a display that displays information such as an image or text and, for example, is configured to include a liquid crystal display panel, an organic electroluminescence (EL) display panel, or the like. In addition, the display 23 and the display 33 may be configured respectively as bodies separate from the terminal 20 and the server 30 and, for example, may be external-type display devices.

The storage 24 and the storage 34, for example, include a hard disk drive (HDD), a solid state drive (SSD), an electrically erasable programmable read-only memory (EEPROM), a read-only memory (ROM), a random access memory (RAM), and the like and store various types of information, images, programs, and the like respectively processed by the terminal controller 25 and the server controller 35. In addition, the storage 24 and the storage 34 are not limited to be respectively built into the terminal 20 and the server 30 and may be external-type storage devices connected using digital input/output ports such as USBs or the like.

The terminal controller 25 is configured to include a central processing unit (CPU) and controls each unit of the terminal 20 by executing various kinds of programs stored in the storage 24. For example, the terminal controller 25 acquires an image captured by the camera 10 through the communicator 21 and performs a process (for example, blurring processing) of reducing the amount of information for a person image shown in the acquired image. In addition, the terminal controller 25 calculates a feature quantity from the person image after processing and transmits the calculated feature quantity to the server 30 through the communicator 21. The server controller 35 is configured to include a CPU and controls each unit of the server 30 by executing various kinds of programs stored in the storage 34. For example, the server controller 35 acquires feature quantities of persons transmitted from a plurality of terminals 20 through the communicator 31, collates the acquired feature quantities, and performs association of the same person. In the following description, when the camera 10, the terminal 20, and the server 30 perform communication, it will be omitted in the description that the communication is performed through the communicator 21 and the communicator 31.

Next, functional components realized by the terminal controller 25 and the server controller 35 executing programs will be described in detail.

Figure 5:
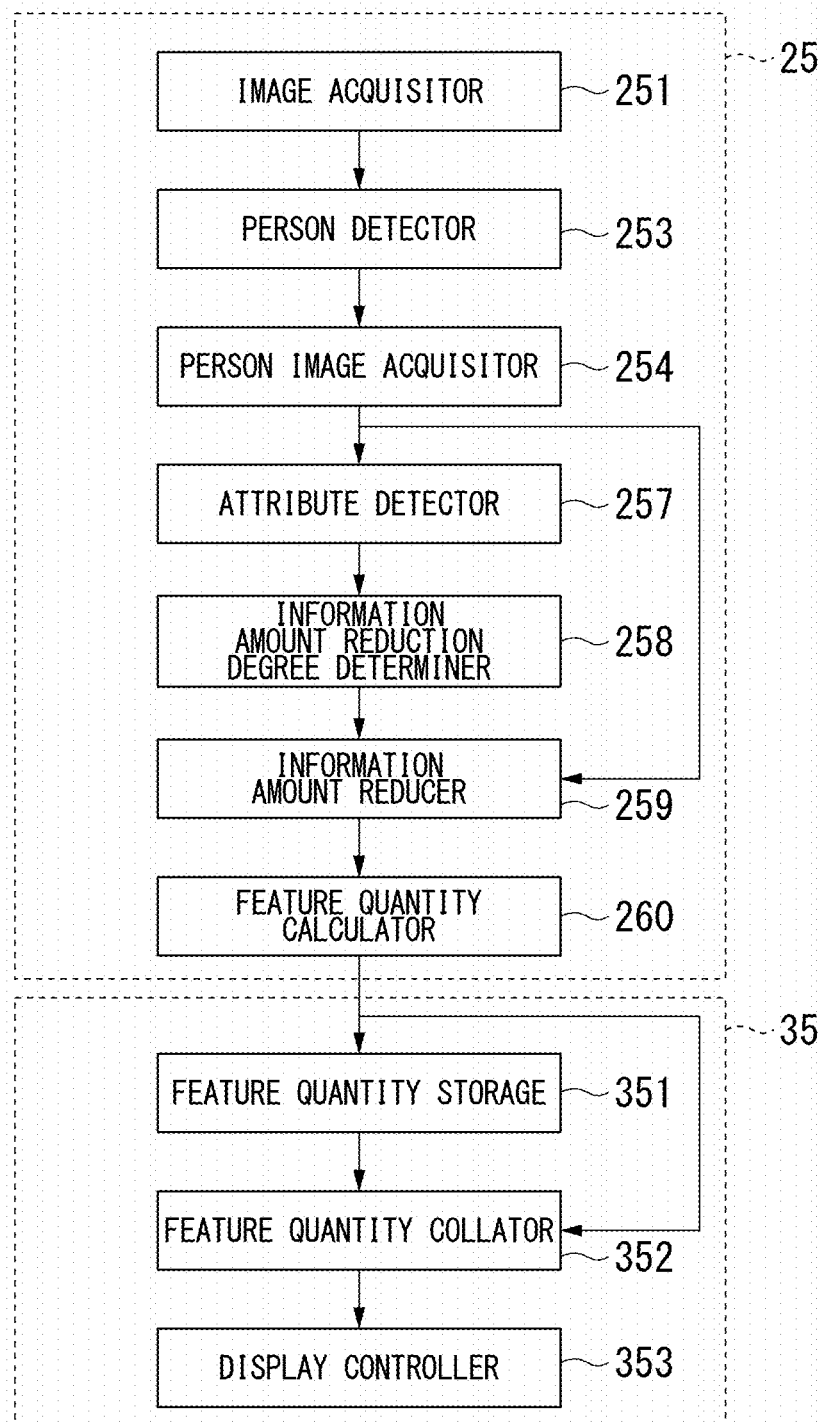
FIG. 5 is a block diagram illustrating one example of the functional components of a terminal controller and a server controller according to the first embodiment.

FIG. 5 is a block diagram illustrating one example of functional components of the terminal controller 25 and the server controller 35 according to this embodiment.

The terminal controller 25 includes an image acquisitor 251, a person detector 253, a person image acquisitor 254, an attribute detector 257, an information amount reduction degree determiner 258, an information amount reducer 259, and a feature quantity calculator 260 (a first feature quantity calculator). The server controller 35 includes a feature quantity storage 351, a feature quantity collator 352 (a first collator), and a display controller 353.

The image acquisitor 251 acquires an image captured by the camera 10. For example, the image acquisitor 251 acquires image data of an image captured by the camera 10. In the following process, an image acquired by the image acquisitor 251 may be processed in real time online or may be processed offline after the image is stored in the storage 24.

The person detector 253 detects a person image of a person shown in an image from the image acquired by the image acquisitor 251. For example, the person detector 253 detects a whole body of a person shown in an image, an upper body half of the person, a face of the person, and a part or the whole of clothing and the like of the person. The detection of a person can be performed using results acquired by a person detector, instance segmentation, semantic segmentation, and the like. The person detector (a face detector, an upper body half detector, or a person detector), the instance segmentation, and the semantic segmentation can be realized using template matching, statistics of luminance gradient information of an image, deep learning, and the like. In addition, the person detector 253 may detect a person image on the basis of differences from a background-only image (an image of the same field angle in which moving bodies such as persons are not present) and the like. The method of detecting a person image is not limited to those described above, and an arbitrary detection method can be applied.

The person image acquisitor 254 acquires a person image detected by the person detector 253. For example, the person image acquisitor 254 acquires a person image acquired by cutting out an area of a person image detected by the person detector 253 from an image acquired by the image acquisitor 251 and outputs the acquired person image to the attribute detector 257 and the information amount reducer 259.

The attribute detector 257 detects attributes of a person on the basis of a person image acquired by the person image acquisitor 254. The attributes of a person represents properties and features of a person and are, for example, a color of clothing, a type of clothing (a suit, trousers, half pants, or a skirt, presence/absence of a hat, presence/absence of glasses, and the like), a hairstyle of a person (long hair, short hair, or the like), a color of the hair of a person, the gender of a person, the age of a person, text (a name and the like), and the like. One attribute or a plurality of items may be configured to be detected. The gender of a person, the age of a person, a hairstyle of a person, a type of clothing, and the like may be estimated using face attribute estimation and person attribute estimation (human attribute recognition). The color of clothing and the color of hair may be estimated using color information (chromaticity and the like) of an image. Text (a name and the like) may be estimated using text recognition. The face attribute estimation, the person attribute estimation, and the text recognition can be realized using template matching, statistics of luminance gradient information of an image, deep learning, or the like. The method of detecting the attributes of a person is not limited to those described above, and an arbitrary detection method may be applied.

The information amount reduction degree determiner 258 determines a degree of reduction of the amount of information (for example, a blurring intensity) at the time of reducing the amount of information of a person image on the basis of attributes detected by the attribute detector 257 (in other words, attributes of a person shown in the image). For example, the information amount reduction degree determiner 258 determines a blurring intensity on the basis of a degree of appearance of an attribute of a person. Here, the degree of appearance of an attribute, for example, is an appearance frequency based on the number of times of appearance in the image captured by the camera 10. For example, in a case in which there is a one person wearing red clothing among five persons, an appearance frequency of red clothing is one and becomes 20%. In a case in which there are three persons wearing blue clothing among five persons, an appearance frequency of blue clothing is three and becomes 60%. The information amount reduction degree determiner 258 determines a blurring intensity to be "strong" for a person image having an attribute of a low appearance frequency such that the degree of reduction of the amount of information becomes higher. Here, the blurring intensity being "strong" is a level set in advance as an amount of blurring for which it is difficult to identify individuals. On the other hand, the information amount reduction degree determiner 258 determines a blurring intensity to be "weak" for a person image having an attribute of a high appearance frequency such that the degree of reduction of the amount of information becomes lower. Here, the blurring intensity being "weak" is a level for which the amount of blurring is smaller than that of "strong" and is a level set in advance for the purpose of inhibiting reduction of collation accuracy.

Here, it may be set in advance that an appearance frequency of an attribute is high, and an appearance frequency of another attribute is low. For example, it may be set in advance that an appearance frequency of an attribute is high, and an appearance frequency of another attribute is low on the basis of results of investigation acquired in advance from images in the past. In addition, an appearance frequency acquired through estimation based on a season, a place, presence/absence of an event, details of an event, a fashion, and the like may be set in advance. For example, for a job conference and the like, it can be estimated that there are many persons wearing suits, and accordingly, an appearance frequency of persons wearing suits may be set to be high in advance.

Figure 6:
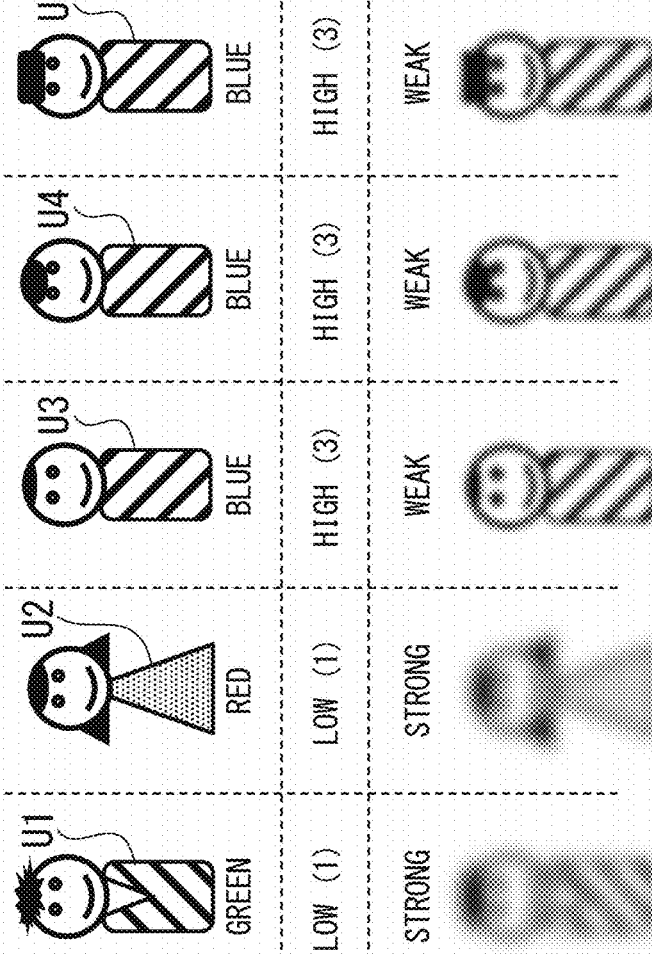
FIG. 6 is a diagram illustrating a setting of association between an appearance frequency of an attribute of a person and a blurring intensity.

FIG. 6 is a diagram illustrating a setting of association between an appearance frequency of an attribute of a person and a blurring intensity. This diagram illustrates an example of a setting of association between a color of clothing as an attribute and a blurring intensity for each color of clothing. In the example illustrated in the drawing, for a person U1 wearing green clothing and a person U2 wearing red clothing, an appearance frequency is low (an appearance number of times is one), and identification of individuals is easy, and accordingly, the blurring intensity is set to be "strong." For persons U3, U4, and U5 wearing blue clothing, an appearance frequency is high (an appearance number of times is three), and, originally, it is difficult to identify individuals, and accordingly, the blurring intensity is set to be "weak." In this embodiment, although an example in which two types of blurring intensity including "strong" and "weak" are used is described, the number of types of blurring intensity is not limited to two, and three or more types of blurring intensity may be used in accordance with an appearance frequency and the like of an attribute.

Referring back to FIG. 5, the information amount reducer 259 generates image data (information-reduced data) acquired by reducing at least a part of the amount of information of an image in accordance with a degree of reduction of the amount of information (for example, a blurring intensity) determined by the information amount reduction degree determiner 258. For example, the information amount reducer 259 performs blurring processing for a person image acquired by the person image acquisitor 254 in accordance with a blurring intensity determined by the information amount reduction degree determiner 258, thereby generating data of an image for which the blurring processing has been performed (image data after the blurring processing).

The feature quantity calculator 260 calculates a person feature quantity (information reduced feature quantity) representing a feature quantity of a person from image data (information reduced data) acquired by performing blurring processing for a person image using the information amount reducer 259. This person feature quantity (an information reduced feature quantity) is that of information reduced data, luminance gradient information calculated from the information reduced data, an output of deep learning having information reduced data as its input, and the like. In addition, the feature quantity calculator 260 transmits the calculated person feature quantity (the information reduced feature quantity) to the server 30. For example, the feature quantity calculator 260 transmits the calculated person feature quantity (the information reduced feature quantity), capture time information of the image, and identification information of the camera 10 that has captured the image in association with each other.

The feature quantity storage 351 receives a person feature quantity (an information reduced feature quantity) transmitted from the feature quantity calculator 260 and stores the received person feature quantity in the storage 34. For example, the feature quantity storage 351 stores a person feature quantity (an information reduced feature quantity) received from each of a plurality of cameras 10, capture time information of an image, and identification information of the camera 10 that has captured the image in the storage 34 in association with each other.

The feature quantity collator 352 collates a plurality of person feature quantities (information reduced feature quantities) received from the plurality of cameras 10, which are stored by the feature quantity storage 351, with each other. As a method of collating person feature quantities with each other, a method using an inner product of two person feature quantities, a Euclid distance between two person feature quantities, an absolute value of a difference between two person feature quantities, or the like can be used. The feature quantity collator 352 associates feature quantities determined as the same person on the basis of a result of the collation.

The display controller 353 causes the display 33 to display information based on a result of the collation acquired by the feature quantity collator 352. For example, the display controller 353 displays statistical information such as features, behavior patterns, and the like of persons.

Figure 7:
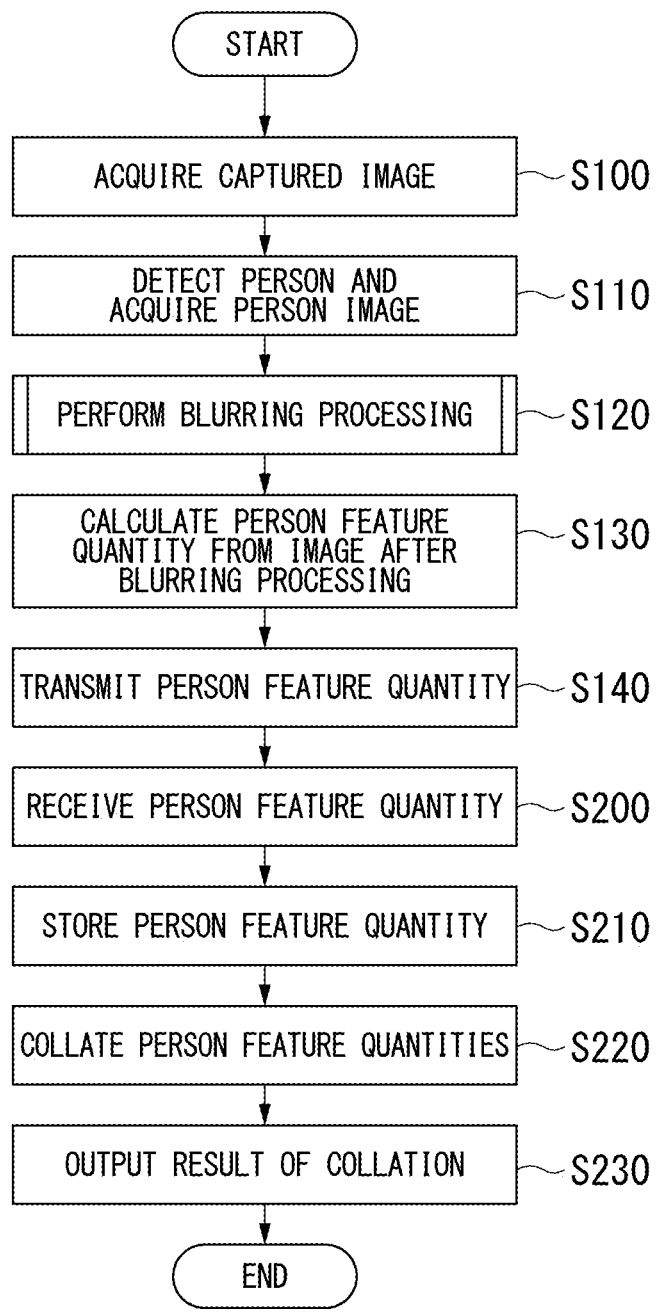
FIG. 7 is a flowchart illustrating one example of Re-id processing according to the first embodiment.

Next, operations of Re-id processing of associating same persons captured by a plurality of cameras 10 in the information processing system 1 will be described with reference to FIG. 7. FIG. 7 is a flowchart illustrating one example of Re-id processing according to this embodiment.

The terminal 20 acquires images captured by the camera 10 (Step S100). The terminal 20 detects person images of persons shown in the images from the images acquired from the camera 10 and acquires data of person images acquired by cutting out areas of the person images (Step S110). Next, the terminal 20 executes blurring processing for the person images (Step S120).

FIG. 8 is a flowchart illustrating details of the blurring processing of Step S120.

The terminal 20 detects attributes of persons on the basis of the person images detected from the images acquired from the camera 10. For example, in the example illustrated in FIG. 6, the terminal 20 detects a color of clothing of a person from the person image (Step S1211). Next, the terminal 20 determines a blurring intensity on the basis of the detected attributes of the person. For example, in the example illustrated in FIG. 6, the terminal 20 determines the blurring intensity for a person image in which a color of clothing is red or green to be "strong" and determines a blurring intensity for a person image in which a color of clothing is blue to be "weak" (Step S1212). Then, the terminal 20 generates image data acquired by blurring the person image with the determined blurring intensity (information reduced data) (Step S1213).

Referring back to FIG. 7, the terminal 20 calculates a person feature quantity from the image data after the blurring processing generated in Step S1213 (Step S130). Then, the terminal 20 transmits the calculated person feature quantity to the server 30 (Step S140).

When the person feature quantity transmitted from the terminal 20 is received (Step S200), the server 30 stores the received person feature quantity in the storage 34 (Step S210). The server 30 collates a plurality of person feature quantities, which are stored, received from a plurality of cameras 10 with each other and associates feature quantities determined as the same person on the basis of results of the collation (Step S220).

Then, the server 30 outputs information based on the results of the collation. For example, the server 30 causes the display 33 to display statistical information of features, behavior patterns, and the like of persons and the like (Step S230).

As described above, the information processing system 1 according to this embodiment determines a blurring intensity (one example of a degree of reduction of the amount of information) on the basis of attributes of a person (one example of a subject) shown in an image and generates information reduced data acquired by reducing at least a part of the amount of information of the image in accordance with the determined blurring intensity. In this way, the information processing system 1 can appropriate reduce an amount of information of an image in accordance with attributes of a subject shown in the image.

In this embodiment, although an example in which a blurring intensity is determined on the basis of one attribute (for example, a color of clothing) has been described, a blurring intensity may be determined on the basis of a plurality of attributes.

In addition, the information processing system 1 calculates an information reduction feature quantity representing a feature quantity of a person (one example of a subject) from the generated information reduced data and collates calculated information reduced feature quantities with each other. In this way, the information processing system 1 can detect the same person from information reduced data while reducing the amount of information of an image on the basis of attributes of a person (one example of a subject) such that it is difficult to identify individuals.

For example, the information processing system 1 determines a blurring intensity (one example of a degree of reduction of the amount of information) on the basis of an appearance frequency (one example of a degree of appearance) of an attribute of a person (one example of a subject). In other words, the information processing system 1 determines whether or not it is easy or difficult to identify a person inside an image on the basis of an appearance frequency of an attribute of a person (one example of a subject) and changes the blurring intensity. The information processing system 1 sets the blurring intensity to be strong for a person image of a person in which an appearance frequency of the same attribute is low (a person who can be easily identified), whereby the privacy is taken into consideration. On the other hand, the information processing system 1 sets the blurring intensity to be weak for a person image of a person for which an appearance frequency of the same attribute is high (a person who cannot be easily identified), whereby a decrease in the collation accuracy is inhibited. By appropriately setting the blurring intensity for each person image, a decrease in the accuracy of collation between persons whose features are similar is inhibited, and a decrease in the collation accuracy can be inhibited as being minimal while the privacy is taken into consideration.

In addition, a degree of appearance such as an appearance number of times may be used instead of the appearance frequency.

In addition, in the information processing system 1, the terminal 20 transmits the calculated information reduced feature quantity to the server 30 through a communication network. In this way, data transmitted to the server 30 through a communication network becomes a data from which it is difficult to identify individuals, and accordingly, a configuration in consideration of privacy can be formed.

Second Embodiment

Next, a second embodiment will be described.

A basic configuration of an information processing system 1 according to this embodiment is similar to the configuration illustrated in FIGS. 4 and 5, and thus description thereof will be omitted. In this embodiment, a blurring intensity is determined for each part of a person, which is different from the first embodiment. For example, there are cases in which an appearance frequency is different for each part such as a hairstyle, clothing of an upper body half, clothing of a lower body half, or the like. In such cases, by increasing the amount of information for a part of which an appearance frequency is high and decreasing the amount of information for a part of which an appearance frequency is low, collation of which accuracy is higher than that of a case in which a single blurring intensity is used can be performed while the privacy is taken into consideration.

For example, a person detector 253 detects a person image for each part of a person shown in an image from the image acquired by an image acquisitor 251. Detection of a part can be performed using results acquired by a person detector (a face detector, an upper body half detector, or a person detector), instance segmentation, a semantic segmentation, and the like. A person image acquisitor 254 acquires a partial image for each part of a person detected by the person detector 253.

An attribute detector 257 detects attributes from a partial image for each part of a person on the basis of a person image acquired by the person image acquisitor 254. An information amount reduction degree determiner 258 determines a blurring intensity on the basis of an attribute for each partial image. An information amount reducer 259 generates image data (an information reduced data) acquired by reducing the amount of information for each partial image in accordance with a blurring intensity for each partial image in a personal image.

FIG. 9 is a diagram illustrating an example of a setting of a blurring intensity for each part of a person according to this embodiment. In this drawing, an example in which attributes are detected for each of three parts including hair, a color of clothing, a color of trousers as attributes, and a blurring intensity is determined in accordance with an appearance frequency of each of the attributes is illustrated. In the example illustrated in the drawing, a person U11 having long hair and a person U15 wearing a hat have low appearance frequencies (the number of times of appearance is one), and individual identification thereof can be easily performed. Accordingly, a blurring intensity for the hair is set to be "strong." On the other hand, persons U12, U13, and U14 having short hair have high appearance frequencies (the number of times of appearance is three), and, originally, individual identification thereof cannot be easily performed. Accordingly, a blurring intensity for the hair is set to be "weak." In addition, the blurring intensity for this hair may be regarded as a blurring intensity for a head (face) part. In addition, the person U11 wearing red clothing and the person U12 wearing green clothing have low appearance frequencies (the number of times of appearance is one), and individual identification thereof can be easily performed. Accordingly, a blurring intensity for the clothing is set to be "strong." On the other hand, the persons U13, U14, and U15 wearing blue clothing have high appearance frequencies (the number of times of appearance is three), and, originally, individual identification thereof cannot be easily performed. Accordingly, a blurring intensity for the clothing is set to be "weak." In addition, the person U13 wearing green trousers has low an appearance frequency (the number of times of appearance is one), and individual identification thereof can be easily performed. Accordingly, a blurring intensity for the trousers is set to be "strong." On the other hand, the persons U11, U12, U14, and U15 wearing blue trousers have high appearance frequencies (the number of times of appearance is four), and, originally, individual identification thereof cannot be easily performed. Accordingly, blurring intensities for the trousers are set to be "weak." In this way, for each part, a blurring intensity for the part is determined in accordance with an appearance frequency of an attribute of each part.

Figure 10:
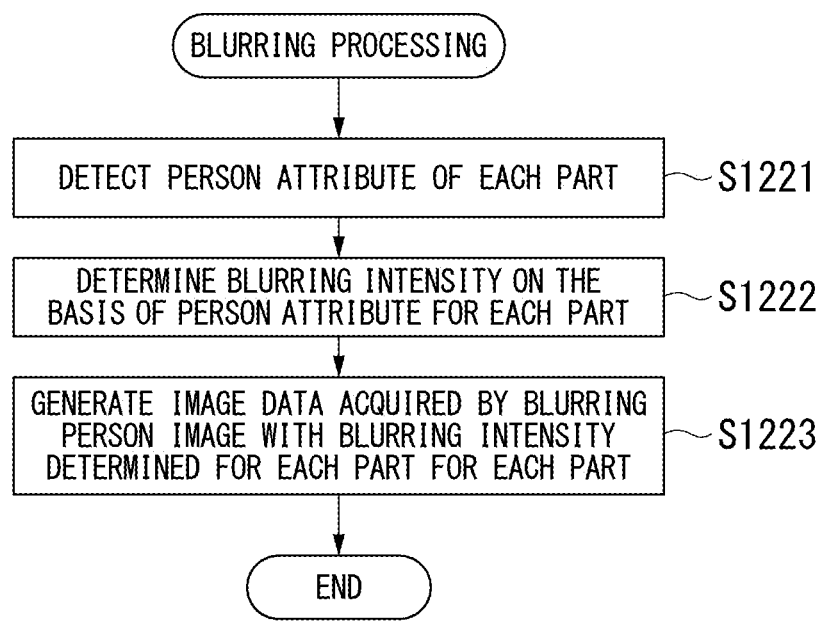
FIG. 10 is a flowchart illustrating blurring processing according to the second embodiment.

FIG. 10 is a flowchart illustrating blurring processing according to this embodiment. The blurring processing illustrated in the drawing is a process executed in the blurring processing of Step S120 illustrated in FIG. 7.

The terminal 20 detects attributes of a person for each part on the basis of a person image. For example, in the example illustrated in FIG. 9, the terminal 20 detects hair, a color of clothing, and a color of trousers of a person from a person image (Step S1221).

Next, the terminal 20 determines a blurring intensity on the basis of the attributes of the person detected for each part. For example, in the example illustrated in FIG. 9, the terminal 20 determines a blurring intensity for a hair part (or a head (face) part) in the person image to be "strong" in the case of a person image having long hair or a hat and determines a blurring intensity to be "weak" in the case of a person image having short hair. In addition, the terminal 20 determines a blurring intensity for a clothing part in the person image to be "strong" in a case of the person image in which the color of clothing is red or green and determines a blurring intensity to be "weak" in a case of the person image in which the color of clothing is blue. Furthermore, the terminal 20 determines a blurring intensity for a trousers part (a lower body half part) in the person image to be "strong" in a case of a person image in which the color of trousers is green and determines the blurring intensity to be "weak" in a case of a person image in which the color of trousers is blue (Step S1222).

Then, the terminal 20 generates image data (information reduced data) acquired by blurring each part of the person image with the determined blurring intensity for each part (Step S1223).

As described above, the information processing system 1 according to this embodiment determines a blurring intensity (one example of a degree of reduction of the amount of information) on the basis of an attribute for each of one or more partial images of a person image and generates information reduced data acquired by reducing the amount information for each partial image in accordance with a blurring intensity for each partial image. In this way, the information processing system 1 sets the amount of information to be large for a part having a high appearance frequency and sets the amount of information to be small for a part having a low appearance frequency. Accordingly, collation with higher accuracy than that of a case in which a single blurring intensity is used can be performed while the privacy is taken into consideration.

Third Embodiment

Next a third embodiment will be described.

A basic configuration of an information processing system 1 according to this embodiment is similar to the configuration illustrated in FIGS. 4 and 5, and thus description thereof will be omitted. In the first and second embodiments, a blurring intensity is determined in accordance with an appearance frequency set in advance. However, there are cases in which an appearance frequency of an attribute changes in accordance with elapse of time. In such cases, by changing a blurring intensity in accordance with an appearance frequency that changes in accordance with the elapse of time, collation with higher accuracy than that of a case in which the blurring intensity is fixed can be performed. Thus, in this embodiment, a configuration in which a blurring intensity is adaptively changed in accordance with an appearance frequency that changes in accordance with the elapse of time will be described.

Figure 11:
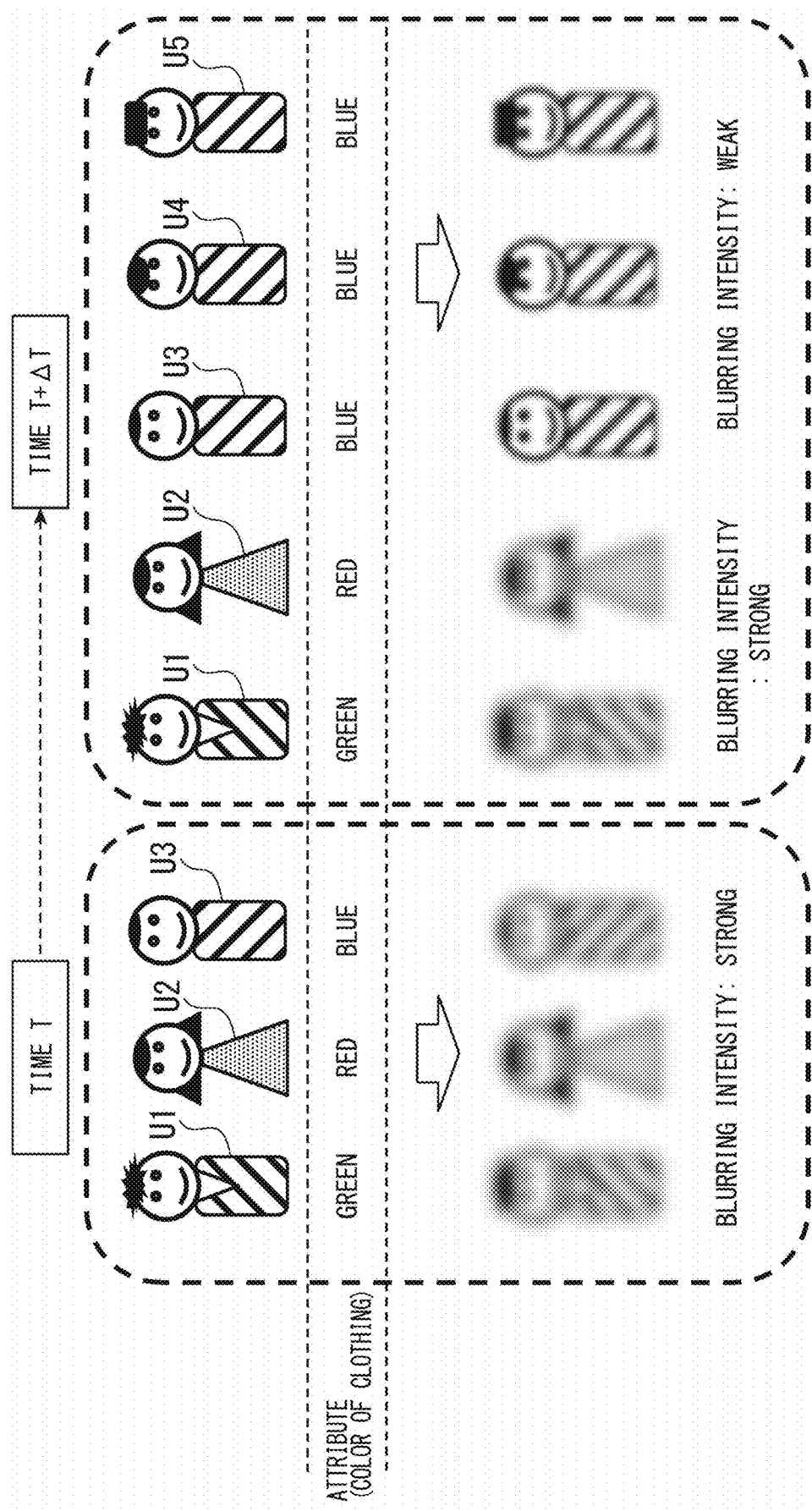
FIG. 11 is a diagram illustrating an example in which a blurring intensity is adaptively changed according to a third embodiment.

FIG. 11 is a diagram illustrating an example in which a blurring intensity is adaptively changed according to this embodiment. For example, at a time T, an appearance frequency of each of persons U1, U2, and U3 whose colors of clothing are green, red, and blue is one, and all the blurring intensities are "strong." At a time T+ΔT after that, it is assumed that appearance frequencies of only the persons U3, U4, and U5 whose colors of clothing are blue are increased. In this case, in a case in which a blurring intensity for a person image in which the color of clothing is blue of which the appearance frequency has been increased is set to be "strong," there is a high likelihood that the collation accuracy decreases. For this reason, when an increase in the appearance frequency of a person whose color of clothing is blue is detected at the time T+ΔT, the terminal 20 changes the blurring intensity for the person image in which the color of clothing is blue to "weak."

Figure 12:
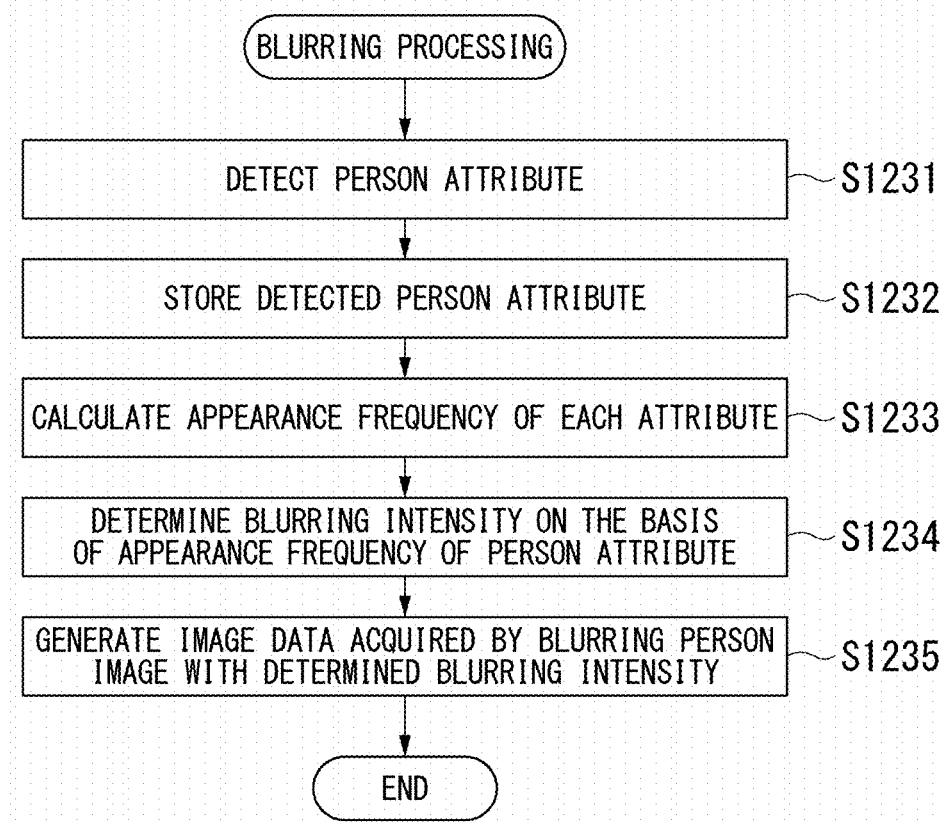
FIG. 12 is a flowchart illustrating blurring processing according to the third embodiment.

FIG. 12 is a flowchart illustrating blurring processing according to this embodiment. The blurring processing illustrated in the drawing is a process executed in the blurring processing of Step S120 illustrated in FIG. 7.

The terminal 20 detects attributes of a person on the basis of a person image detected from an image acquired from the camera 10. For example, in the example illustrated in FIG. 6, the terminal 20 detects a color of clothing of a person from a person image (Step S1231). The terminal 20 stores the detected attribute of the person (for example, a color of clothing) in the storage 24 (Step S1232). The terminal 20 occasionally calculates and updates an appearance frequency of each attribute in accordance with elapse of time on the basis of attributes (for example, colors of clothing) of a plurality of persons stored in the storage 24 (Step S1233). The terminal 20 determines a blurring intensity of a detected attribute (for example, a color of clothing) of a person on the basis of the latest appearance frequency that has been updated (Step S1234). Then, the terminal 20 generates image data (information reduced data) acquired by blurring the person image with the determined blurring intensity (Step S1235).

In addition, as described in the second embodiment, also in a case in which a blurring intensity is determined for each part of a person, the terminal 20 may adaptively change a blurring intensity for each part in accordance with an appearance frequency of an attribute for each part that changes in accordance with elapse of time.

As described above, the information processing system 1 according to this embodiment adaptively changes a blurring intensity in accordance with an appearance frequency that changes in accordance with elapse of time, and accordingly, collation with higher accuracy than that of a case in which the blurring intensity is fixed can be performed.

In addition, by detecting an appearance frequency of an attribute from the start, a blurring intensity may be adaptively changed. Alternatively, a blurring intensity may be initially set to be "strong" or "weak," and thereafter, the blurring intensity may be adaptively changed in accordance with the appearance frequency that changes in accordance with elapse of time. In a case in which a blurring intensity is set to be "strong" as an initial setting, protection of privacy is prioritized. On the other hand, in a case in which a blurring intensity is set to be "weak" as an initial setting, collation accuracy is prioritized.

Fourth Embodiment

Next a fourth embodiment will be described.

A basic configuration of an information processing system 1 according to this embodiment is similar to the configuration illustrated in FIGS. 4 and 5, and thus description thereof will be omitted. As described in the third embodiment, in a case in which a blurring intensity is adaptively changed in accordance with an appearance frequency of an attribute that changes in accordance with elapse of time, correct collation may not be able to be performed in collation between a feature quantity calculated from a person image blurred with a blurring intensity after the change and a feature quantity calculated from a person image blurred with a blurring intensity before the change. Although collation between only feature quantities before change and collation between only feature quantities after change can be performed, the blurring intensity is different in collation between before and after a change point. Accordingly, feature quantities are changed also for the same person, and correct collation may not be able to be performed.

For example, as illustrated in FIG. 11, in a case in which a blurring intensity for a person image in which a color of clothing is blue is set to "strong" at a time T but is changed to "weak" at a time T+ΔT in accordance with an increase in the appearance frequency, collation between a person image in which a color of clothing is blue at the time T and a person image in which a color of clothing is blue at the time T+ΔT cannot be correctly performed. Thus, in this embodiment, as illustrated in FIG. 13, in a case in which image data (information reduced data) acquired by blurring a person image of persons U3, U4, and U5 whose colors of clothing are blue with a blurring intensity "weak" determined in accordance with an appearance frequency is generated, the terminal 20 also generates image data (information reduced data) acquired by blurring the person image with a blurring intensity "strong" in addition thereto. FIG. 13 is a diagram illustrating a blurring intensity according to this embodiment. In other words, the information amount reducer 259 generates image data (information reduced data) acquired by blurring with a blurring intensity determined in accordance with an appearance frequency of an attribute from a person image and additionally generates image data (information reduced data) acquired by blurring with a blurring intensity higher than the blurring intensity.

Figure 14:
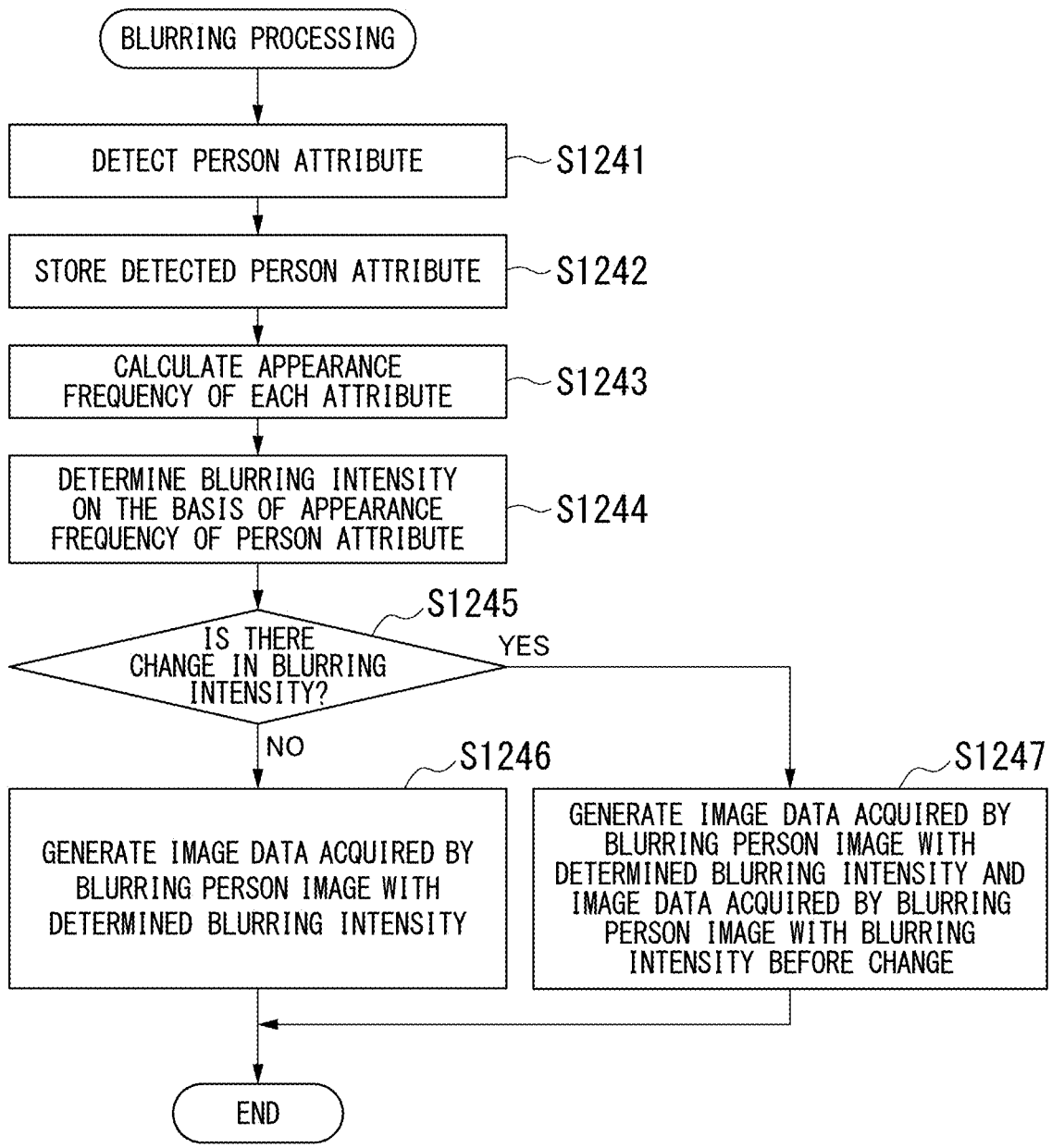
FIG. 14 is a flowchart illustrating blurring processing according to the fourth embodiment.

FIG. 14 is a flowchart illustrating blurring processing according to this embodiment. The blurring processing illustrated in the drawing is a process executed in the blurring process of Step S120 illustrated in FIG. 7. Processes of Steps S1241 to S1244 illustrated in FIG. 14 are similar to the processes of Steps S1231 to S1234 illustrated in FIG. 12. Here, operations of processes of Step S1245 and subsequent steps will be described.

The terminal 20 determines whether or not there has been a change in a blurring intensity determined in Step S1244 from a blurring intensity that was previously determined (Step S1245). In a case in which it is determined that there has been no change in Step S1245 (No), the terminal 20 generates image data (information reduced data) acquired by blurring a person image with the blurring intensity determined in Step S1244. For example, in a case in which there has been no change in the blurring intensity with being maintained to be "strong," the terminal 20 generates image data (information reduced data) acquired by blurring a person image with the blurring intensity "strong" (Step S1246).

On the other hand, in a case in which it is determined that there has been a change in Step S1245 (Yes), the terminal 20 generates image data (information reduced data) acquired by blurring the person image with the blurring intensity determined in Step S1244 and image data (information reduced data) acquired by blurring the person image with the blurring intensity before the change. For example, in a case in which the blurring intensity has been changed from "strong" to "weak," the terminal 20 generates image data (information reduced data) acquired by blurring the person image with a blurring intensity "weak" and image data (information reduced data) acquired by blurring the person image with the blurring intensity "strong" before the change (Step S1247).

As described above, the information processing system 1 according to this embodiment generates image data (information reduced data) acquired by blurring with a blurring intensity (for example, a blurring intensity "weak") determined in accordance with an appearance frequency of an attribute a person image and additionally generates image data (information reduced data) acquired by blurring with a blurring intensity (for example, a blurring intensity "strong") higher than the blurring intensity. In this way, in a case in which the blurring intensity is changed, the information processing system 1 can perform collation before and after a change.

In addition, in a case in which the blurring intensity has been changed from "weak" to "strong," the terminal 20 may generate image data (information reduced data) acquired by blurring with a blurring intensity "strong" and image data (information reduced data) acquired by blurring with the blurring intensity "weak" (Step S1247) In this way, in a case in which the blurring intensity is changed in accordance with a change in the appearance frequency, the terminal 20 may generate image data (information reduced data) acquired by blurring a person image with a blurring intensity before the change in addition to generation of image data (information reduced data) acquired by blurring the person image with a blurring intensity after the change.

In addition, in a case in which the blurring intensity is determined to be "weak" regardless of presence/absence of a change in the blurring intensity, the terminal 20 may generate image data (information reduced data) acquired by blurring a person image with a blurring intensity "strong" before change in addition to the generation of image data (information reduced data) acquired by blurring the person image with a blurring intensity "weak." To the contrary, in a case in which the blurring intensity is determined to be "strong" regardless of presence/absence of a change in the blurring intensity, the terminal 20 may generate image data (information reduced data) acquired by blurring a person image with a blurring intensity "weak" before change in addition to the generation of image data (information reduced data) acquired by blurring the person image with a blurring intensity "strong." In addition, the terminal 20 may generate both image data (information reduced data) acquired by blurring a person image with a blurring intensity "strong" and image data (information reduced data) acquired by blurring the person image with a blurring intensity "weak" regardless of presence/absence of a change in the blurring intensity.

Fifth Embodiment

Next, a fifth embodiment will be described.

Figure 15:
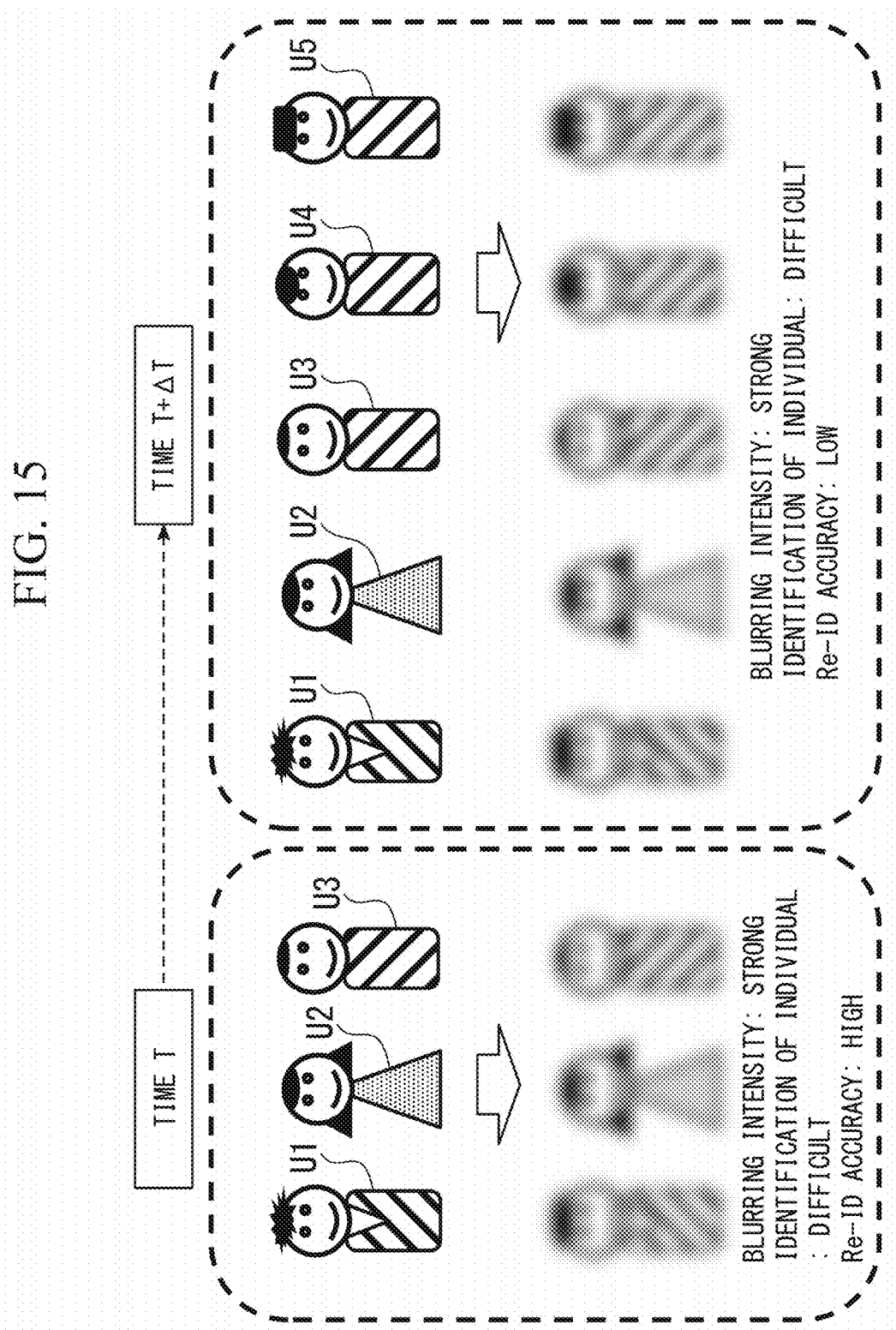
FIG. 15 is a diagram illustrating a blurring intensity according to a fifth embodiment.

FIG. 15 is a diagram illustrating a blurring intensity according to this embodiment. As described in the third embodiment, in a case in which the blurring intensity is adaptively changed in accordance with an appearance frequency of an attribute that changes in accordance with elapse of time, there is a time difference between a time at which the appearance frequency has been changed and a time at which the blurring intensity is changed in accordance with the change. In the example illustrated in the drawing, at a time T, an appearance frequency of each of persons U1, U2, and U3 whose colors of clothing are green, red, and blue is one, and all the blurring intensities are "strong." At a time T+ΔT after that, although appearance frequencies of only persons U3, U4, and U5 whose colors of clothing are blue are increased, the blurring intensity of any one thereof is maintained to be "strong" in accordance with a time difference until the blurring intensity is changed. In accordance with this time difference, when the blurring intensity for a person image in which the color of clothing is blue is originally to be changed to "weak" in accordance with the increase in the appearance frequency as illustrated in FIG. 11, there is a time in which image data (information reduced data) acquired by blurring with an intended blurring intensity cannot be generated.

Thus, in this embodiment, the terminal 20 has a function for storing an acquired image for a predetermined time and generates image data (information reduced data) acquired by blurring with an intended blurring intensity from a timing at which there has been a change in the appearance frequency by retroactively applying the blurring intensity that has been changed with a delay in accordance with the time difference to stored images. The basic configuration of an information processing system 1 according to this embodiment is similar to the configuration illustrated in FIG. 4, and a part of the functional configuration is different from the configuration illustrated in FIG. 4.

Figure 16:
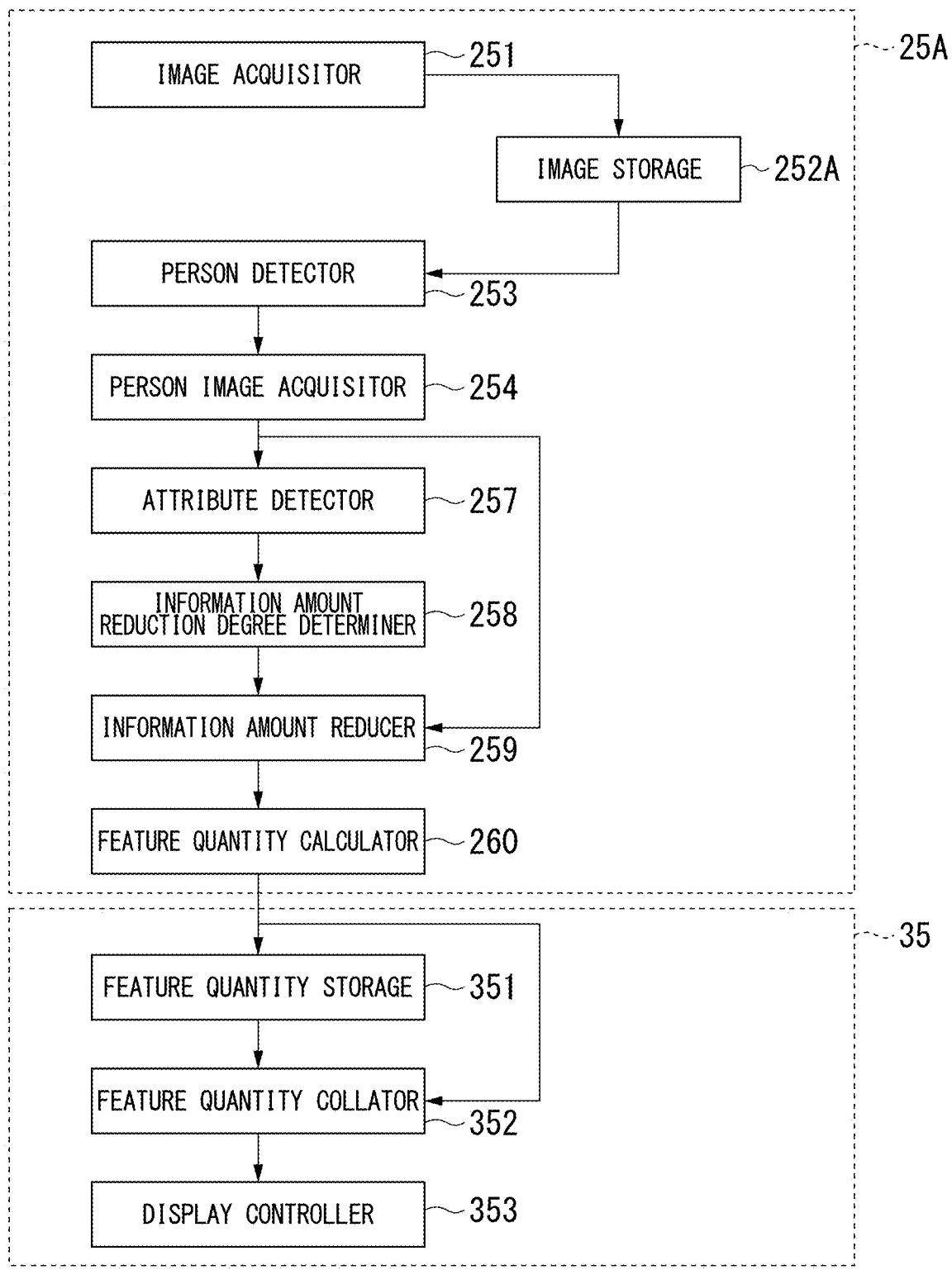
FIG. 16 is a block diagram illustrating one example of the functional configurations of a terminal controller and a server controller according to the fifth embodiment.

FIG. 16 is a block diagram illustrating one example of the functional configurations of a terminal controller 25A and a server controller 35 according to this embodiment. The terminal controller 25A is a functional configuration according to this embodiment corresponding to the terminal controller 25 illustrated in FIGS. 4 and 5. The terminal controller 25A further includes an image storage 252A, which is different from the functional configuration of the terminal controller 25 illustrated in FIG. 5. The image storage 252A stores images acquired by an image acquisitor 251 in a storage 24 for a predetermined time. In addition, since there is a highest risk of leakage of an image in a communication part from the terminal 20 to a server 30, by storing images only in the terminal 20, the risk of leakage of images can be inhibited, and the privacy can be considered.

In a case in which the blurring intensity is changed in accordance with a change in the appearance frequency of an attribute, an information amount reducer 259 regenerates image data (information reduced data) acquired by blurring a person image acquired from stored images with a blurring intensity after change. Then, a feature quantity calculator 260 recalculates a person feature quantity from image data (information reduced data) that has been regenerated and transmits the calculated person feature quantity to the server 30. In this way, the blurring intensity after change can be applied to an image from a time at which the appearance frequency has been changed by going back a time difference between a time at which the appearance frequency has been changed and a time at which the blurring intensity is changed in accordance with the change.

Figure 17:
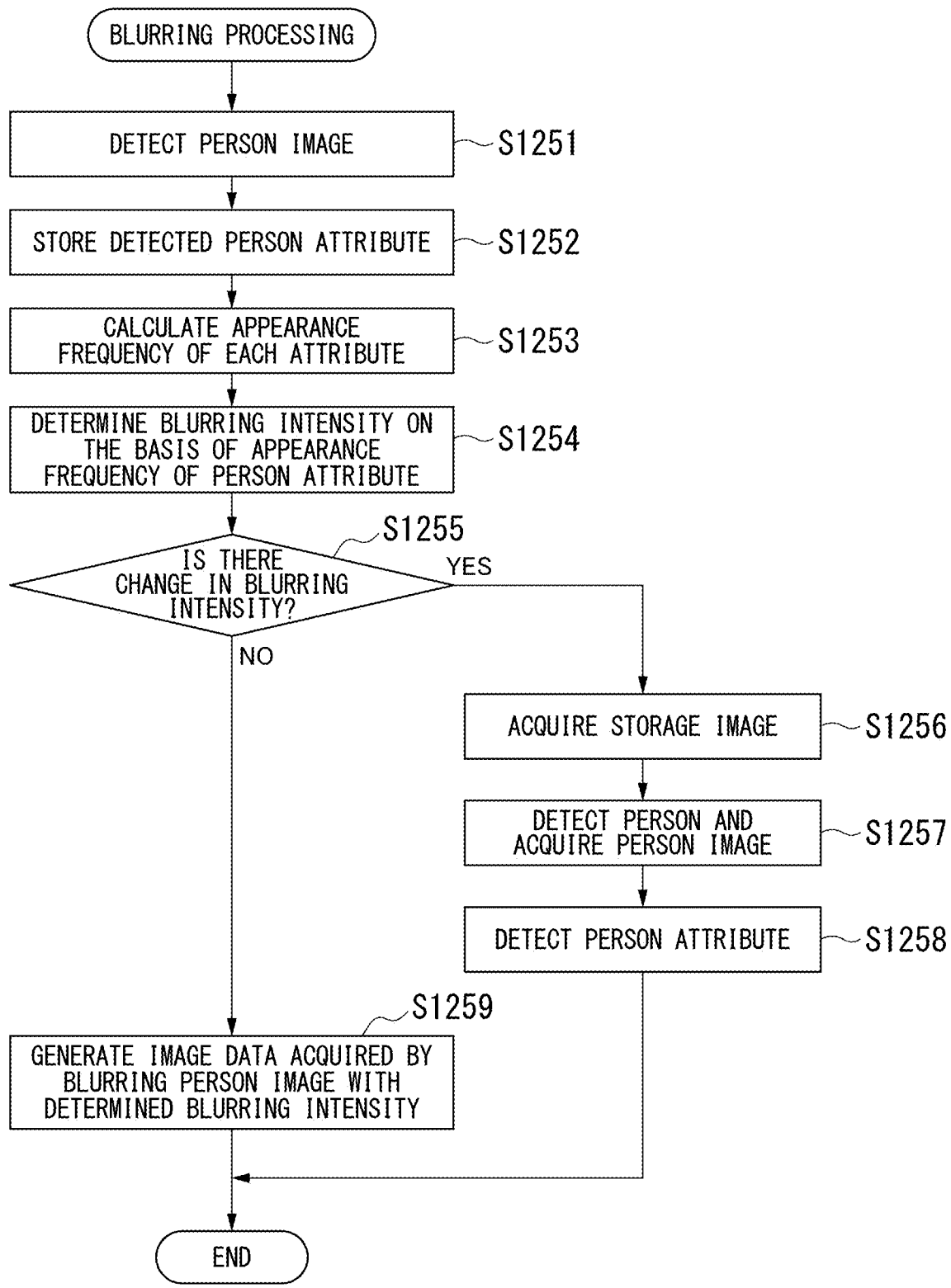
FIG. 17 is a flowchart illustrating blurring processing according to the fifth embodiment.

FIG. 17 is a flowchart illustrating blurring processing according to this embodiment. The blurring processing illustrated in the drawing is a process executed in the blurring process of Step S120 illustrated in FIG. 7. Processes of Steps S1251 to S1254 illustrated in FIG. 17 are similar to the processes of Steps S1231 to S1234 illustrated in FIG. 12. Here, operations of processes of Step S1255 and subsequent steps will be described.

The terminal 20 determines whether or not there has been a change in a blurring intensity determined in Step S1254 from a blurring intensity that was previously determined (Step S1255). In a case in which it is determined that there has been no change in the blurring intensity in Step S1255 (No), the terminal 20 generates image data (information reduced data) acquired by blurring a person image with the blurring intensity determined in Step S1254 For example, in a case in which there has been no change in the blurring intensity determined in Step S1254 with being maintained to be "strong," the terminal 20 generates image data (information reduced data) acquired by blurring a person image with the blurring intensity "strong" (Step S1259).

On the other hand, in a case in which it is determined that there has been a change in the blurring intensity in Step S1255 (for example, the blurring intensity determined in Step S1254 has been changed from "strong" to "weak") (Yes), the terminal 20 acquires an image (for example, an image acquired from a time at which the appearance frequency has been changed) that has been stored (Step S1256). Then, the terminal 20 detects a person image from the acquired image and acquires data of a person image acquired by cutting out an area of the person image (Step S1257). In addition, the terminal 20 detects an attribute (for example, a color of clothing) of a person from the acquired person image. Then, the terminal 20 generates image data (information reduced data) acquired by blurring a person image acquired from the storage image with the blurring intensity "weak" (Step S1259).

As described above, the information processing system 1 according to this embodiment has a function of storing an image acquired from the camera 10 and generates information reduced data acquired by reducing at least a part of the amount of information of the stored image in accordance with the changed blurring intensity in a case in which the blurring intensity (one example of a degree of reduction of the amount of information) is changed on the basis of an attribute of a person (one example of a subject) shown in the image. In this way, the information processing system 1 can apply the blurring intensity after change to an image from a time at which the appearance frequency has been changed by going back a time difference between a time at which the appearance frequency has been changed and a time at which the blurring intensity is changed in accordance with the change.

Sixth Embodiment

Next, a sixth embodiment will be described.

Figure 18:
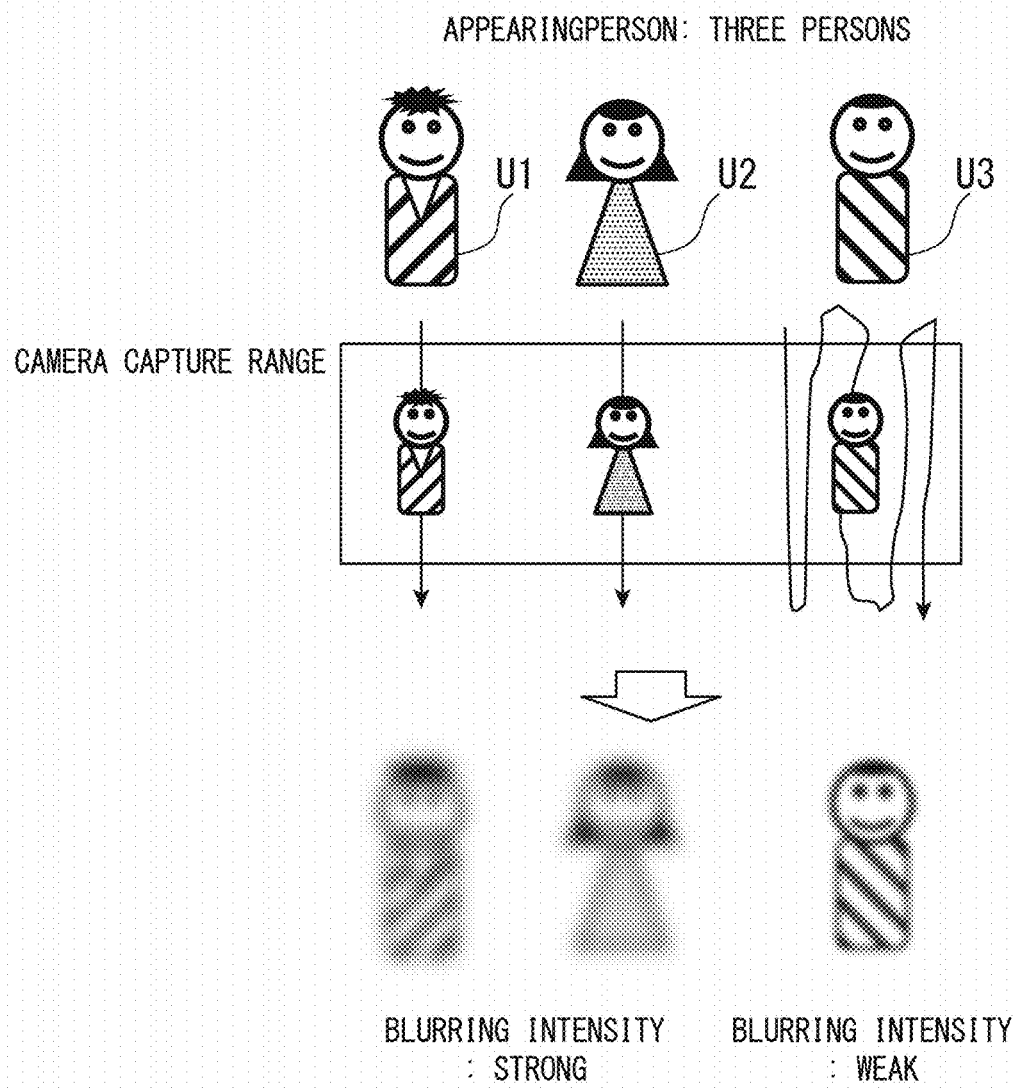
FIG. 18 is a diagram illustrating an appearance frequency of a person according to a sixth embodiment.

A basic configuration of an information processing system 1 according to this embodiment is similar to the configuration illustrated in FIG. 4, and thus description thereof will be omitted. In a case in which the blurring intensity is adaptively changed in accordance with an appearance frequency of an attribute changing in accordance with the elapse of time, it is determined that an attribute of a person captured a plurality of number of times has an appearance frequency higher than that of an attribute of a person who is captured only once. For example, as illustrated in FIG. 18, it is determined that persons U1 and U2 who have passed through the inside of a capture range (a capture field angle) of the camera 10 only once have a low appearance frequency, and the blurring intensity is set to "strong." On the other hand, there are cases in which a person U3 who has passed through the inside of the capture range (the capture field angle) of the camera 10 any number of times, who is an actually one person and is to be determined to have a low appearance frequency, is determined to have a high appearance frequency, and the blurring intensity is set to "weak." In other words, there may be a deviation between an actual appearance frequency of an attribute and an appearance frequency of the attribute calculated from the number of times of capturing, and the blurring intensity may not be able to be correctly determined.

Figure 19:
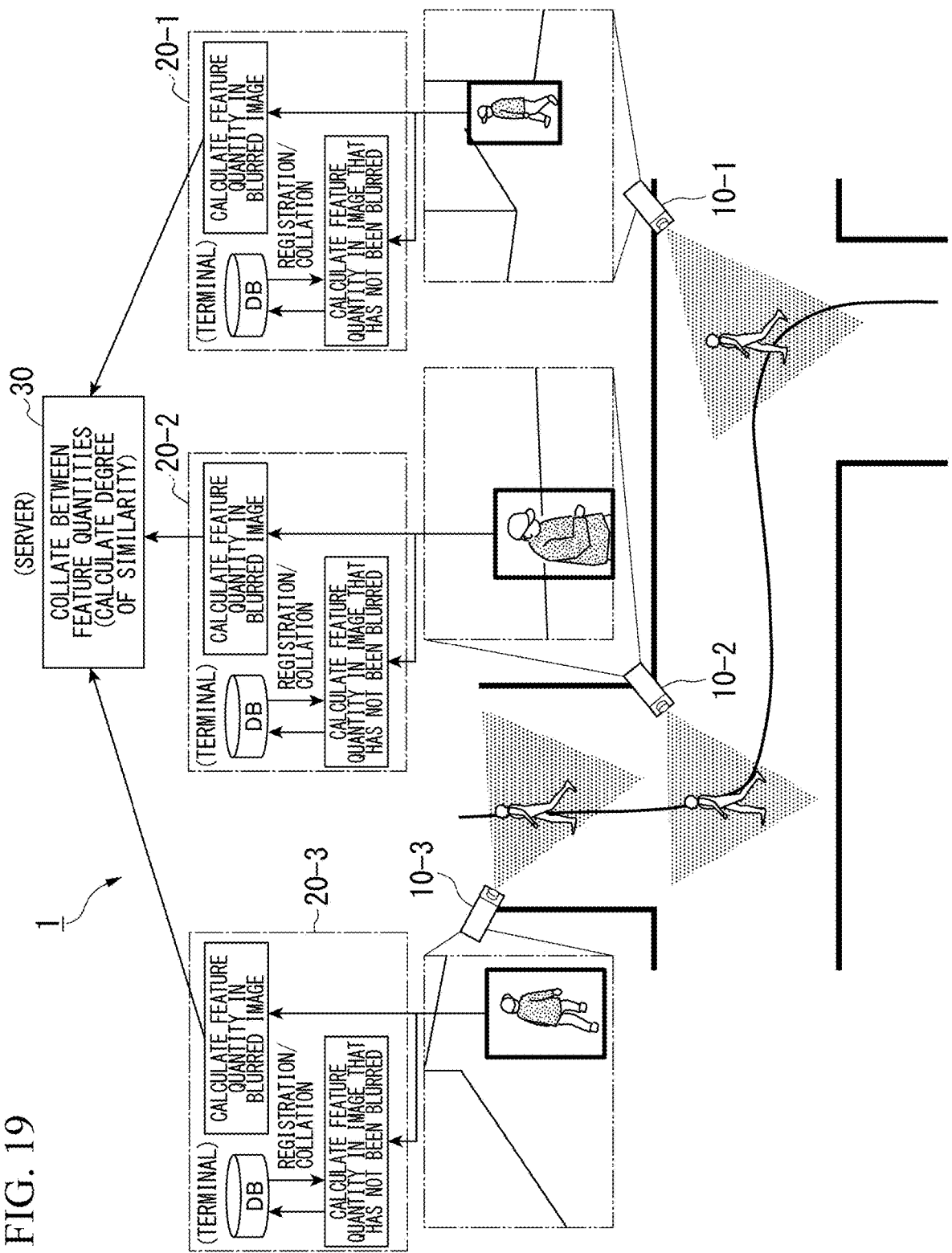
FIG. 19 is a system diagram illustrating an overview of an information processing system according to the sixth embodiment.

Thus, in this embodiment, the terminal 20 calculates a feature quantity from an image before blurring processing, and performs collation with high accuracy for identifying an individual, whereby the same person who has been captured a plurality of number of times is identified. FIG. 19 is a system diagram illustrating an overview of the information processing system 1 according to this embodiment. In the example illustrated in the drawing, collation for identifying the same person is performed before blurring processing using the terminal 20, which is different from the example illustrated in FIG. 1. Since the terminal 20 identifies the same person and calculates an appearance frequency without doubly counting an appearance frequency of an attribute of the same person, a deviation between the actual appearance frequency of an attribute and an appearance frequency of the attribute calculated from the number of times of capturing can be inhibited. In addition, the feature quantity from which an individual can be identified is placed only inside the terminal 20 but is not transmitted to the server 30, and accordingly, the privacy can be considered.

Figure 20:
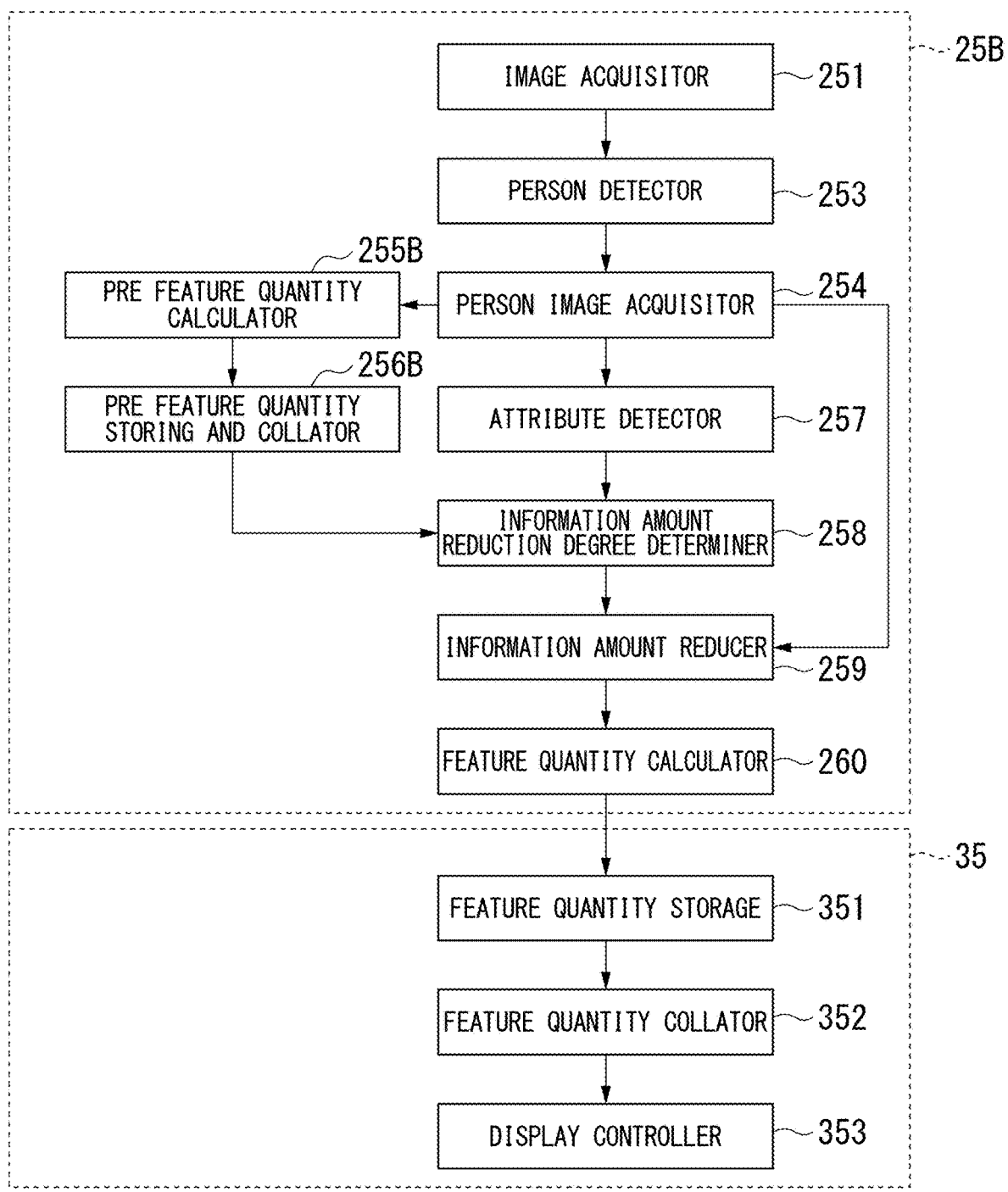
FIG. 20 is a block diagram illustrating one example of the functional configurations of a terminal controller and a server controller according to the sixth embodiment.

FIG. 20 is a block diagram illustrating one example of the functional configurations of a terminal controller 25B and a server controller 35 according to this embodiment. The terminal controller 25B is a functional configuration according to this embodiment that corresponds to the terminal controller 25 illustrated in FIGS. 4 and 5. The terminal controller 25B further includes a pre feature quantity calculator 255B (a second feature quantity calculator) and a pre feature quantity storing and collator 256B (a second collator), which is different from the functional configuration of the terminal controller 25 illustrated in FIG. 5.

The pre feature quantity calculator 255B calculates a person feature quantity (a feature quantity before reduction of the amount of information) representing a feature quantity of a person from a person image acquired by the person image acquisitor 254 (in other words, a person image before blurring processing). This person feature quantity (a feature quantity before reduction of the amount of information) is that of a person image acquired by the person image acquisitor 254 (in other words, a person image before blurring processing), luminance gradient information calculated from the person image, an output of deep learning having the person image as its input, and the like. For example, the pre feature quantity calculator 255B outputs the calculated person feature quantity (a feature quantity before reduction of the amount of information), the capture time information of the image, and identification information of the person image to the pre feature quantity storing and collator 256B in association with each other.

The pre feature quantity storing and collator 256B stores the person feature quantity (the feature quantity before reduction of the amount of information) output from the pre feature quantity calculator 255B, capture time information of the image, and the identification information of the person image in the storage 24 in association with each other. In addition, the pre feature quantity storing and collator 256B collates stored person feature quantities (feature quantities before reduction of amount of information) with each other. As a method of collating person feature quantities with each other, a method using an inner product of two person feature quantities, a Euclid distance between two person feature quantities, an absolute value of a difference between two person feature quantities, or the like can be used. The pre feature quantity storing and collator 256B associates feature quantities determined as the same person on the basis of results of collation with the calculated identification information of the person image, thereby identifying person images of the same person. Then, the pre feature quantity storing and collator 256B outputs the same person information including the same persons and identification information of the identified person images to the information amount reduction degree determiner 258.

The information amount reduction degree determiner 258 calculates an appearance frequency of an attribute on the basis of the same person information output from the pre feature quantity storing and collator 256B and the attribute detected by the attribute detector 257 (in other words, an attribute of a person shown in the image). For example, the information amount reduction degree determiner 258 counts an appearance number of times of attributes of the same person among attributes detected by the attribute detector 257 as one although the attributes have appeared a plurality of number of times (captured a plurality of number of times). In this way, the information amount reduction degree determiner 258 calculates an appearance frequency such that an appearance frequency of attributes of the same person is not doubly counted and determines a blurring intensity on the basis of the calculated appearance frequency.

Figure 21:
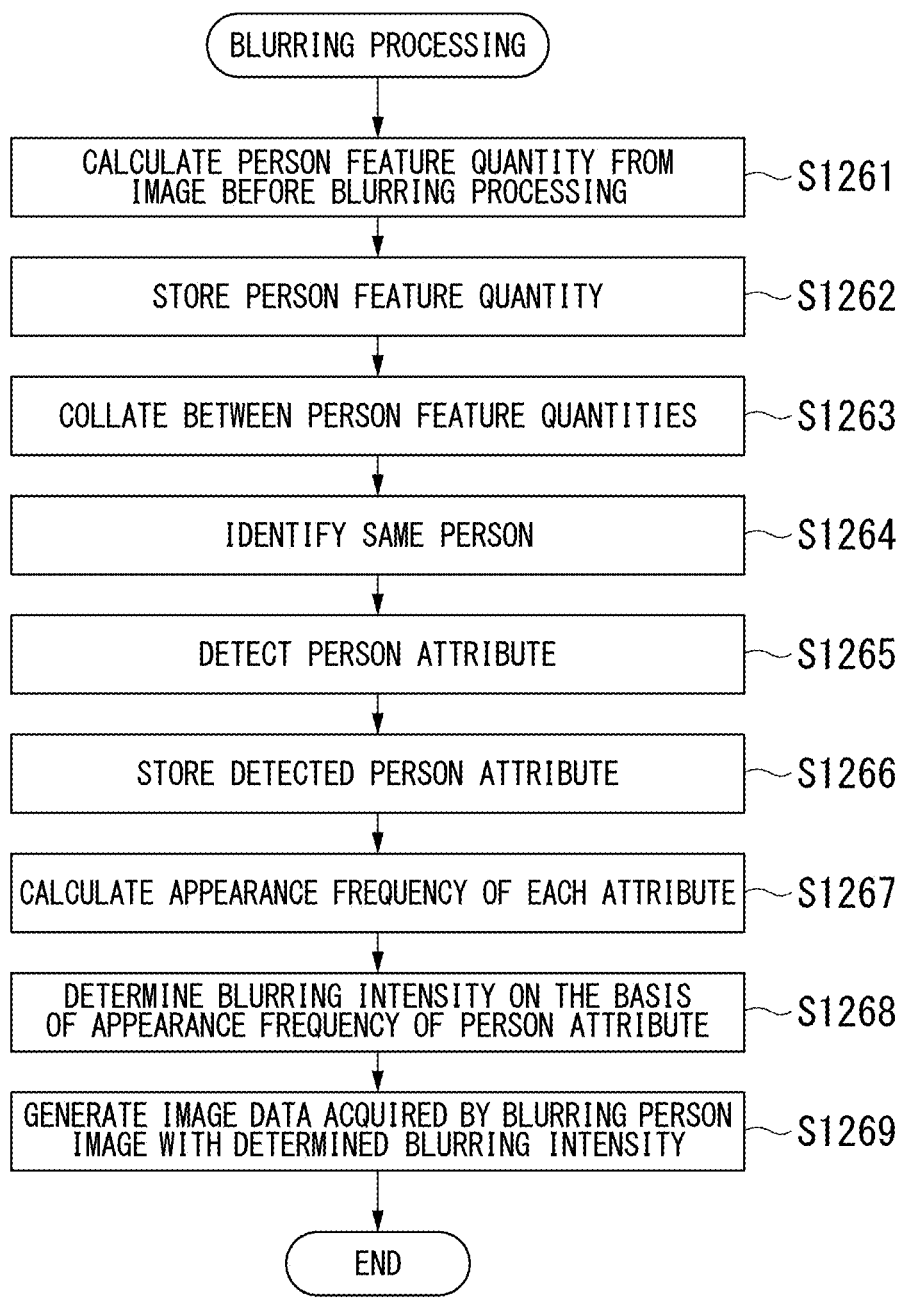
FIG. 21 is a flowchart illustrating blurring processing according to the sixth embodiment.

FIG. 21 is a flowchart illustrating blurring processing according to this embodiment. The blurring processing illustrated in the drawing is a process executed in the blurring processing of Step S120 illustrated in FIG. 7.

The terminal 20 calculates a person feature quantity (an feature quantity before reduction of the amount of information) from a person image (in other words, a person image before blurring processing) acquired by the person image acquisitor 254 (Step S1261) and stores the calculated person feature quantity (a feature quantity before reduction of the amount of information) in the storage 24 (Step S1262). The terminal 20 collates stored person feature quantities (feature quantities before reduction of the amount of information) with each other (Step S1263) and identifies person images of the same person on the basis of results of the collation (Step S1264).

In addition, the terminal 20 detects an attribute (for example, a color of clothing) of a person from a person image detected from an image acquired from the camera 10 (Step S1265) and stores the detected attribute of the person in the storage 24 (Step S1266). Then, the terminal 20 calculates an appearance frequency of an attribute on the basis of person images identified as the same person and detected attributes (in other words, attributes of a person shown in the image) such that an appearance frequency of the attributes of the same person is not doubly counted (Step S1267).

Then, the terminal 20 determines a blurring intensity of the detected attribute of the person (for example, a color of clothing) on the basis of the calculated appearance frequency (Step S1268) and generates image data (information reduced data) acquired by blurring the person image with the determined blurring intensity (Step S1269).

As described above, the information processing system 1 according to this embodiment calculates a person feature quantity (a feature quantity before reduction of the amount of information) of a person (one example of a subject) from an image before reduction of the amount of information and collates the person feature quantities (feature quantities before reduction of the amount of information). Then, the information processing system 1 determines a blurring intensity (one example of an information reduction degree) on the basis of a result of collation between the attribute of the person (one example of the subject) shown in the image and a person feature quantity before reduction of the amount of information (a feature quantity before reduction of the amount of information).

In accordance with this, in a case in which the same person reciprocates the inside of the capture range (the image field angle) of the camera 10 any number of times and is captured a plurality of number of times, the information processing system 1 can identify the same person and can count the appearance frequency without being doubly counted. Accordingly, a deviation between an actual appearance frequency of the attribute and an appearance frequency of the attribute calculated from the number of times of capturing can be inhibited. Accordingly, the amount of information of the image can be appropriately reduced.

In addition, the pre feature quantity storing and collator 256B may output the same person information to the attribute detector 257 instead of or in addition to the information amount reduction degree determiner 258. In such a case, the attribute detector 257 transmits attributes of person images identified as the same person in association with information indicating the same person, whereby the information amount reduction degree determiner 258 may be configured not to doubly count the appearance frequency of the attributes of the same person.

Modified Example

In the embodiment described above, although an example in which the information amount reduction degree determiner 258 selects and determines one among blurring intensities ("strong," "weak," and the like) set in advance has been described, the blurring intensity may be determined through calculation. For example, the information amount reduction degree determiner 258 may determine a blurring intensity through calculation using a calculation equation for calculating the value of the blurring intensity and the like on the basis of the appearance frequency.

In the embodiment described above, although an example in which the same person is detected as an example of a case in which the subject is a person has been described, the subject may be an object other than a person. For example, the subject may be any one of various objects such as a vehicle and an animal instead of the person. For example, the subject is a moving body that can move and is an object (target object) focused inside a captured image. The detection of various objects such as a vehicle and the like can be performed using results acquired by a vehicle detector, a text detector, a general object detector, instance segmentation, semantic segmentation, and the like. These can be realized using template matching, statistics of luminance gradient information of an image, deep learning, or the like. For example, in a case in which the subject is a vehicle, attributes are a vehicle type and a color of the vehicle. The vehicle type can be estimated using vehicle recognition. The color of the vehicle can be estimated using color information (chromaticity and the like) of the image. Recognition of a vehicle can be realized using template matching, statistics of luminance gradient information of an image, deep learning, and the like. In addition, also in a case in which the subject is a vehicle, the amount of information may be reduced by determining an information reduction quantity on the basis of attributes of each part such as a color of the vehicle, a vehicle type, a number plate, and the like. In accordance with this, also in a case in which the subject is an object other than a person, similarly, collation with higher accuracy than that of a case in which a single information reduction degree is used can be performed while the privacy is taken into consideration.

In addition, an image acquired by the image acquisitor 251 is not limited to a color image but may be a grey image. Even in the grey image, a type of clothing (a suite, trousers, half pants, or a skirt, or the like), a hairstyle (long hair, short hair, or the like), presence/absence of a hat, presence/absence of glasses, and the like can be determined. In addition, the color may be determined from the density of the grey image. Furthermore, the image acquisitor 251 may acquire a distance image from a distance sensor.

In addition, the terminal 20 and the server 30 described above have a computer system inside. By recording a program for realizing the function of each component included in the terminal 20 and the server 30 described above in a computer-readable recording medium and causing a computer system to read and execute the program recorded in this recording medium, the process of each component included in the terminal 20 and the server 30 described above may be performed. Here, "causing a computer system to read and execute the program recorded in the recording medium" includes installing the program in the computer system. The "computer system" described here includes an operating system (OS) and hardware such as peripherals. In addition, a "computer system" may include a plurality of computer devices connected through a network including the Internet, a WAN, and a LAN and a communication line such as a dedicated line. Furthermore, the "computer-readable recording medium" represents a portable medium such as a flexible disk, a magneto-optical disk, a ROM, or a CD-ROM or a storage device such as a hard disk built in the computer system. In this way, the recording medium storing a program may be a non-transitory recording medium such as a CD-ROM.

In addition, the recording medium includes a recording medium installed inside or outside that is accessible from a distribution server for distributing the program. Furthermore, a configuration in which the program is divided into a plurality of parts, and the parts are downloaded at different timings and then are combined in each configuration included in the terminal 20 and the server 30 may be employed, and distribution servers distributing the divided programs may be different from each other. In addition, the "computer-readable recording medium" includes a medium storing the program for a predetermined time such as an internal volatile memory (RAM) of a computer system serving as a server or a client in a case in which the program is transmitted through a network. Furthermore, the program described above may be a program used for realizing a part of the function described above. In addition, the program may be a program to be combined with a program that has already been recorded in the computer system for realizing the function described above, a so-called a differential file (differential program).

Furthermore, a part or the whole of each function included in the terminal 20 and the server 30 according to the embodiment described above may be realized by an integrated circuit of a large scale integration (LSI) or the like. Each function may be individually configured as a processor, or a part or the whole of the functions may be integrated and configured as a processor. In addition, a technique used for configuring the integrated circuit is not limited to the LSI, and each function may be realized by a dedicated circuit or a general-purpose processor. Furthermore, in a case in which a technology of configuring an integrated circuit replacing the LSI emerges in accordance with the progress of semiconductor technologies, an integrated circuit using such a technology may be used.

In addition, in the embodiment described above, although an example in which information processing system 1 is a server-client type system including the terminal 20 and the server 30 has been described as an example, the information processing system 1 may be configured as one integrated information processing device. In such a case, a component collating feature quantity may be included or may not be included. In other words, a configuration until the amount of information is reduced with a blurring intensity according to an appearance frequency (one example of an information reduction degree) for an image captured by the camera 10 may be employed, and thereafter, a configuration in which feature quantities are calculated, and collation of the same person is performed may be employed. In addition, the camera 10 is not limited to a plurality of cameras but may be one camera. More specifically, the information processing system may be applied to a monitoring device used for simply monitoring and recording passengers, visitors, and the like using one or a plurality of cameras installed in a facility such as a store or a building, a street such as a shopping street, a station yard, a parking lot, or the like.

According to at least one embodiment described above, by including the image acquisitor (251) that acquires an image acquired by imaging an actual space, the information amount reduction degree determiner (258) that determines a degree of reduction of an amount of information on the basis of an attribute of a subject shown in the image, the information amount reducer (259) that generates information reduced data acquired by reducing at least a part of the amount of information of the image in accordance with the degree of reduction of the amount of information determined by the information amount reduction degree determiner, the amount of information of the image can be appropriately reduced.

While several embodiments of the present invention have been described, such embodiments are presented as examples but are not intended to limit the scope of the present invention. These embodiments may be performed in other various forms, and various omissions, substitutions, and changes may be performed in a range not departing from the concept of the present invention therein. These embodiments and the modifications thereof, similar to a case where these are included in the scope or the concept of the invention, are included in inventions described in the claims and equivalent ranges thereof.

What is claimed is:

1. An information processing device comprising:
    an image acquisitor that acquires an image acquired by imaging an actual space, the image including a plurality of subjects each of which includes a respective attribute;
    an information amount reduction degree determiner that determines, for each attribute, a respective degree of appearance of subjects having its attribute shown in the image, the respective degree of appearance of each attribute corresponding to a respective number of subjects having each attribute appearing in the image; the information amount reduction degree determiner adjusts, for each attribute, a respective degree of reduction of an amount of information of a respective subject based on its respective degree of appearance of the attribute, so that the degree of reduction of the amount of information is smaller as the respective degree of appearance is greater and so that the degree of reduction of the amount of information is larger as the respective degree of appearance is smaller; and
    an information amount reducer that generates information reduced data acquired by reducing at least a part of the amount of information of the image in accordance with the degree of reduction of the amount of information determined by the information amount reduction degree determiner.

2. The information processing device according to claim 1, further comprising:
    a first feature quantity calculator that calculates an information reduced feature quantity representing a feature quantity of the subject from the information reduced data; and
    a first collator that collates the information reduced feature quantities.

3. The information processing device according to claim 2, further comprising:
    a transmitter that transmits the information reduced feature quantity to the server through a communication network.

4. The information processing device according to claim 1,
    wherein the information amount reduction degree determiner determines the degree of reduction of the amount of information on the basis of an attribute of each of one or more partial images of the image, and
    wherein the information amount reducer generates the information reduced data acquired by reducing the amount of information of the partial image in accordance with the degree of reduction of the amount of information of each partial image.

5. The information processing device according to claim 1, wherein the information amount reducer generates the information reduced data according to the degree of reduction of the amount of information from the image and further generates the information reduced data according to a degree of reduction of the amount of information higher than this degree of reduction of the amount of information.

6. The information processing device according to claim 1,
    wherein the image acquisitor has a function of storing the image, and
    wherein, in a case in which the information amount reduction degree determiner changes the degree of reduction of the amount of information on the basis of the attribute of the subject shown in the image, the information amount reducer generates the information reduced data acquired by reducing at least a part of the amount of information of the stored image in accordance with the degree of reduction of the amount of information changed by the information amount reduction degree determiner.

7. The information processing device according to claim 1, further comprising:
    a second feature quantity calculator that calculates a feature quantity before reduction of the amount of information representing a feature quantity of the subject from the image before reduction of the amount of information using the information amount reducer; and
    a second collator that collates the feature quantities before reduction of the amount of information,
    wherein the information amount reduction degree determiner determines the degree of reduction of the amount of information on the basis of a result of collation between the attribute of the subject shown in the image and the feature quantity before reduction of the amount of information.

8. The information processing device according to claim 1, wherein the information reduction degree is a blurring intensity at the time of reducing the amount of information by blurring the image, and
wherein the information reduction data is image data acquired by performing blurring processing of at least a part of the image with this blurring intensity.

9. The information processing device according to claim 2, further comprising:
a terminal including the image acquisitor, the information amount reduction degree determiner, the information amount reducer, and the first feature quantity calculator; and
a server including the first collator,
wherein the terminal transmits the information reduced feature quantity calculated from the information reduced data to the server, and
wherein the server receives the information reduced feature quantity from the terminal.

10. The information processing device according to claim 9, wherein the terminal further includes:
a second feature quantity calculator that calculates a feature quantity before reduction of the amount of information representing the feature quantity of the subject from the image; and
a second collator that collates the feature quantities before reduction of the amount of information.

11. An information processing system comprising:
a terminal; and
a server, wherein the terminal includes:
an image acquisitor that acquires an image acquired by imaging an actual space, the image including a plurality of subjects each of which includes a respective attribute;
an information amount reduction degree determiner that determines, for each attribute, a respective degree of appearance of subjects having its attribute shown in the image, the respective degree of appearance of each attribute corresponding to a respective number of subjects having each attribute appearing in the image; the information amount reduction degree determiner adjusts, for each attribute, a respective degree of reduction of an amount of information of a respective subject based on its respective degree of appearance of the attribute, so that the degree of reduction of the amount of information is smaller as the respective degree of appearance is greater and so that the degree of reduction of the amount of information is larger as the respective degree of appearance is smaller;
an information amount reducer that generates information reduced data acquired by reducing at least a part of the amount of information of the image in accordance with the degree of reduction of the amount of information determined by the information amount reduction degree determiner;
a feature quantity calculator that calculates an information reduced feature quantity representing a feature quantity of the subject from the information reduced data; and
a transmitter that transmits the information reduced feature quantity to the server through a communication network, wherein the server includes:
a receiver that receives the information reduced feature quantity transmitted from the server; and
a collator that collates the information reduced feature quantities received by the receiver.

12. An information processing method using an information processing device, the information processing method comprising:
acquiring an image acquired by imaging an actual space, the image including a plurality of subjects each of which includes a respective attribute;
determining, for each attribute, a respective degree of appearance of subjects having its attribute shown in the image, the respective degree of appearance of each attribute corresponding to a respective number of subjects having each attribute appearing in the image;
adjusting, for each attribute, a respective degree of reduction of an amount of information of a respective subject based on its respective degree of appearance of the attribute, so that the degree of reduction of the amount of information is smaller as the respective degree of appearance is greater and so that the degree of reduction of the amount of information is larger as the respective degree of appearance is smaller; and
generating information reduced data acquired by reducing at least a part of the amount of information of the image in accordance with the determined degree of reduction of the amount of information.

13. A non-transitory computer readable storage medium that stores computer program for causing a computer to execute:
acquiring an image acquired by imaging an actual space by using an image acquisitor, the image including a plurality of subjects each of which includes a respective attribute;
determining, for each attribute, a respective degree of appearance of subjects having its attribute shown in the image, the respective degree of appearance of each attribute corresponding to a respective number of subjects having each attribute appearing in the image;
adjusting, for each attribute, a respective degree of reduction of an amount of information of a respective subject based on its respective degree of appearance of the attribute, so that the degree of reduction of the amount of information is smaller as the respective degree of appearance is greater and so that the degree of reduction of the amount of information is larger as the respective degree of appearance is smaller; and
generating information reduced data acquired by reducing at least a part of the amount of information of the image in accordance with the determined degree of reduction of the amount of information.

* * * * *